US012423161B1

(12) United States Patent
Ni et al.

(10) Patent No.: US 12,423,161 B1
(45) Date of Patent: Sep. 23, 2025

(54) CLUSTER RIGHT-SIZING FOR CLOUD-BASED APPLICATIONS

(71) Applicant: Amazon Technologies, Inc., Seattle, WA (US)

(72) Inventors: Shaokang Ni, Seattle, WA (US); Siyu Wang, Seattle, WA (US); Letian Feng, Clyde Hill, WA (US); Malcolm Featonby, Sammamish, WA (US); Nathaniel Baird Jones, Carnation, WA (US); Zachary Daniel Casper, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 473 days.

(21) Appl. No.: 18/067,664

(22) Filed: Dec. 16, 2022

(51) Int. Cl.
*G06F 3/00* (2006.01)
*G06F 9/50* (2006.01)

(52) U.S. Cl.
CPC ...... *G06F 9/5077* (2013.01); *G06F 2209/501* (2013.01); *G06F 2209/505* (2013.01)

(58) Field of Classification Search
CPC ........................................................ G06F 9/50
See application file for complete search history.

(56) References Cited

U.S. PATENT DOCUMENTS

| | | | |
|---|---|---|---|
| 7,581,224 B2 | 8/2009 | Romero | |
| 8,606,920 B1 * | 12/2013 | Gupta | G06F 9/5011 709/226 |
| 9,858,123 B1 | 1/2018 | Dailianas et al. | |
| 10,333,782 B1 | 6/2019 | Kitagawa et al. | |
| 11,170,137 B1 * | 11/2021 | Richardson | G06N 10/20 |
| 2016/0283221 A1 * | 9/2016 | Kochar | G06F 8/654 |
| 2019/0243691 A1 * | 8/2019 | LaBute | H04L 47/83 |
| 2019/0258631 A1 * | 8/2019 | Pal | G06F 16/24535 |
| 2020/0050612 A1 * | 2/2020 | Bhattacharjee | G06F 16/2471 |
| 2020/0310876 A1 * | 10/2020 | Featonby | G06F 9/5088 |
| 2022/0006860 A1 * | 1/2022 | Lima | H04L 67/1074 |
| 2022/0100548 A1 * | 3/2022 | Ito | H04L 43/0888 |
| 2022/0156114 A1 | 5/2022 | Nagpal | |
| 2022/0383324 A1 * | 12/2022 | Sheshadri | H04L 41/16 |
| 2024/0370307 A1 * | 11/2024 | You | G06F 9/5072 |

OTHER PUBLICATIONS

Tania Lorido-Botran, A Review of Auto-scaling Techniques for Elastic Applications in Cloud Environments. (Year: 2013).*
U.S. Appl. No. 18/067,623, filed Dec. 16, 2022, Shaokang Ni, et al.

* cited by examiner

*Primary Examiner* — Lechi Truong
(74) *Attorney, Agent, or Firm* — S. Scott Foster; Kowert, Hood, Munyon, Rankin & Goetzel, P.C.

(57) ABSTRACT

Systems and methods for implementing a right-sizing service that recommends and automatically implements sizing recommendations for nodes and resources of compute clusters executing applications is disclosed. Performance metrics for compute nodes executing the application may be gathered and normalized with anomalous nodes excluded. Then, respective time series data for the compute nodes may be temporally aligned to identify phases of execution of the application and resource sizes may be estimated for the various phases. A sizing recommendation may then be made based in part on this estimated resource sizes. The sizing recommendation may further integrate with other sizing recommendations and be used to manually or automatically size a compute cluster or selected among a number of pre-sized compute clusters, in various embodiments.

20 Claims, 18 Drawing Sheets

Collect performance metrics for heterogenous nodes of a compute cluster that executes an application, the performance metrics including time series data and resource utilization data 300

Normalize the performance metrics according to CPU benchmarks performed for the respective heterogeneous nodes 310

Exclude anomalous nodes having performance metrics inconsistent with performance metrics of other ones of the heterogeneous nodes 320

Temporally align respective time series data of the performance metrics of the remaining respective nodes to eliminate performance anomalies due to asynchronous activity to identify a plurality of phases of execution of the application 330

Estimate resource sizes for respective ones of the phases of execution 340

Identify a slowest node of the plurality of heterogeneous nodes according to the performance metrics 350

Determine a recommendation for resource sizing according to the respective resource size estimates and the identified slowest node 360

FIG. 3

CLUSTER RIGHT-SIZING FOR CLOUD-BASED APPLICATIONS

BACKGROUND

Applications are increasingly deployed using cloud-based compute service infrastructures. However, clients of these cloud-based compute service infrastructures must balance costs of such deployments with execution performance of their applications which may have complex interactions with other cloud-based services and vary greatly over time. Additionally, these clients frequently lack tools to provide insight to compute service requirements for their applications, to prioritize among various cloud-based services and to effectively deploy tuning of these services over time.

BRIEF DESCRIPTION OF DRAWINGS

FIG. 3 is a process flow diagram that illustrates a process for determining right-sizing recommendations for applications executing on a compute cluster of variable size, according to at least some embodiments.

Figure 1:
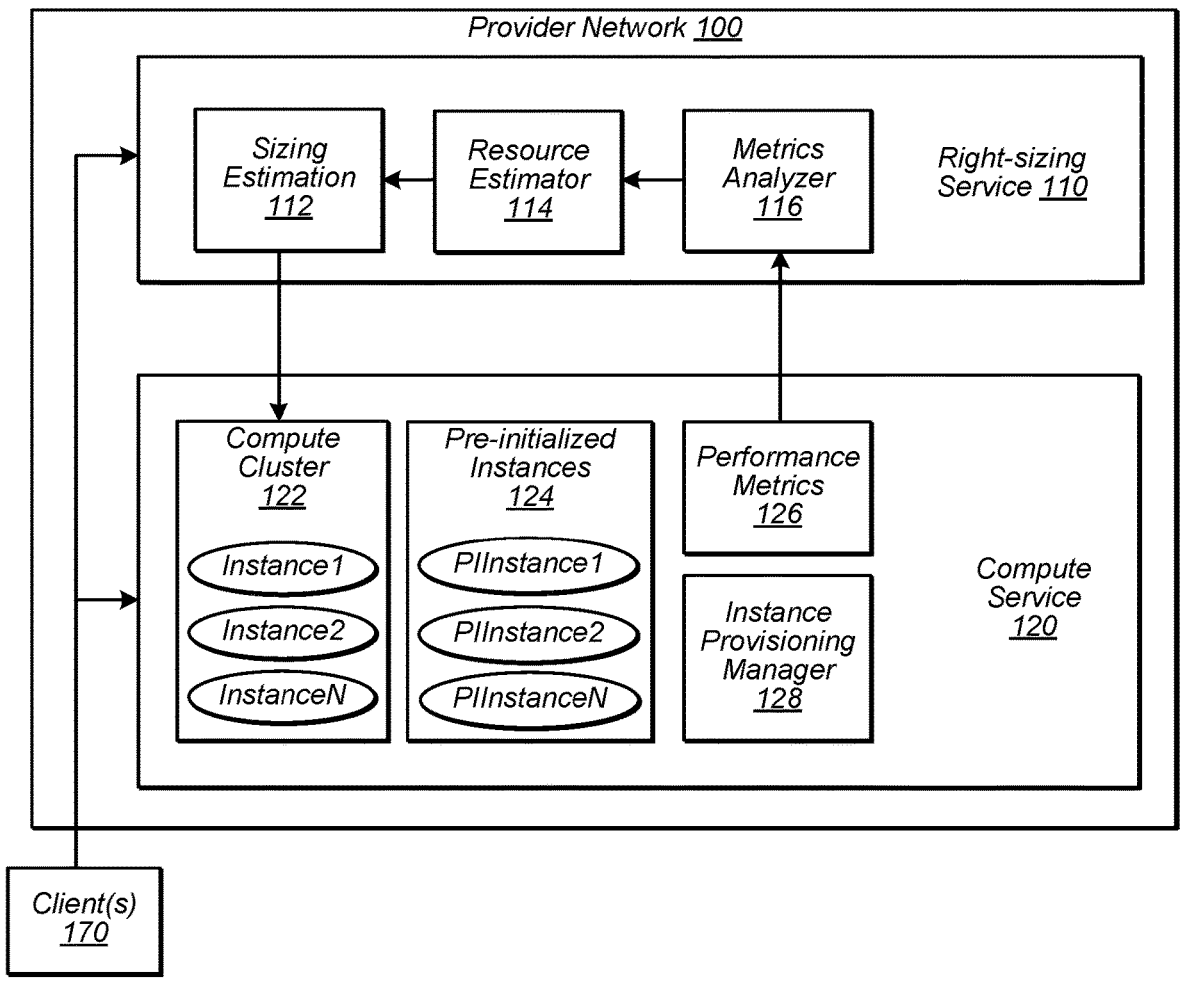
FIG. 1 is a block diagram of an architecture for a system that implements task right-sizing for compute clusters, according to at least some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Clients of cloud-based compute service infrastructures increasingly struggle to effectively right-size infrastructure requirements for applications or tasks they deploy in cloud service environments, leading to poor performance of these applications and/or excessive costs to mitigate those performance issues. This is due to a number of reasons, including a lack of tools providing insights into compute service requirements for their applications, an inability to prioritize among various cloud-based services and difficulty in deploying tuning of these services over time. These issues may be further exacerbated by complex interactions with among various cloud-based services within applications as well as performance demands that may vary greatly over time.

Systems and methods for implementing a right-sizing service that recommends and optionally automatically implements sizing recommendations for compute clusters executing applications is disclosed. Performance metrics for compute nodes executing the application may be gathered and normalized to compensate for the heterogeneous nature of those nodes, with performance of anomalous nodes excluded. Then, respective time series data for the compute nodes may be temporally aligned to identify phases of execution of the application and resource sizes may be estimated for the various phases. A sizing recommendation may then be made based in part on this estimated resource sizes. The sizing recommendation may further integrate with other sizing recommendations and be used to manually or automatically size a compute cluster or selected among a number of pre-sized compute clusters, in various embodiments.

FIG. 1 is a block diagram of an architecture for a system that implements task right-sizing for compute clusters, according to at least some embodiments. Various components illustrated in FIG. 1 may perform functionality illustrated in FIGS. 2-4, as described below.

Illustrated is a Provider Network 100 that may include various services including a Compute Service 120 and a Right-sizing Service 110. The Compute Service 120 may include an instance provisioning manager 128, compute cluster(s) 122 and pre-initialized compute instances 124. Instances as referred to herein may include virtual instances or physical instances or systems with various combinations thereof, in some embodiments. Instance provisioning manager 128 may manage the provisioning of compute instances of the compute service. For example, the instance provisioning manager 128 may use pre-initialized instances 124, such as PIInstance1-PIInstanceN, to create, tune and maintain Compute Clusters 122 by adding, increasing, subtracting and/or decreasing instances such as Instance1-InstanceN from the Compute Cluster. The instance provisioning manager 128 may perform these tasks automatically or upon request from client(s) 170. It should be understood that a compute cluster may include a collection of the same or similar instances in some embodiments while in other embodiments heterogeneous instances differing in available computing resources such as processor and memory resources may be employed.

For example, a client 170 may request that the instance provisioning manager provide instances to be pre-initialized and/or may request that the provisioning manager pre-initialize the instances. In some embodiments, compute service 150 may implement, manage and provide an API for accessing a fleet of compute instances. At least some of the fleet of compute instances may form one or more common pools of instances. Various different pools of instances may be grouped based on the underlying resources of the instances, in some embodiments. Instances from a common pool may be provided in response to clients that request an instance (e.g., other services of a service provider may be clients that request the instance, etc.).

Clients 170, external and/or internal (not shown) to the compute service 120, may request compute cluster(s) 122, execute applications on a compute cluster 122 and request a right-sizing service 110 to provide recommendations on resource sizing for a computer cluster 122. To generate a resource sizing recommendation, the right-sizing service 110 may obtain various performance metrics 126 from the compute service 120. These metrics may include performance data and time series data related to execution of an application on various instances of a compute cluster 122. In addition, the performance metrics may include benchmarking data for various instances of the compute cluster 122 and various metadata regarding the configuration of the compute cluster 122 as well as relevant application metadata useful to analyze performance of the application on the compute cluster 122.

A metrics analyzer 116 may use these performance metrics to generate normalized metrics describing execution of various phases of the application, as discussed later in FIGS. 2 and 4. These normalized metrics may then be used by a resource estimator 114 to generate an estimated resource sizes to optimize performance of individual nodes of a cluster 122 in performing the application. These resource estimates may then be combined with cluster performance predictions to generate a right-sizing recommendation for the compute cluster, with the recommendation provided to the client 170 or automatically applied to the compute cluster 122.

Figure 2:
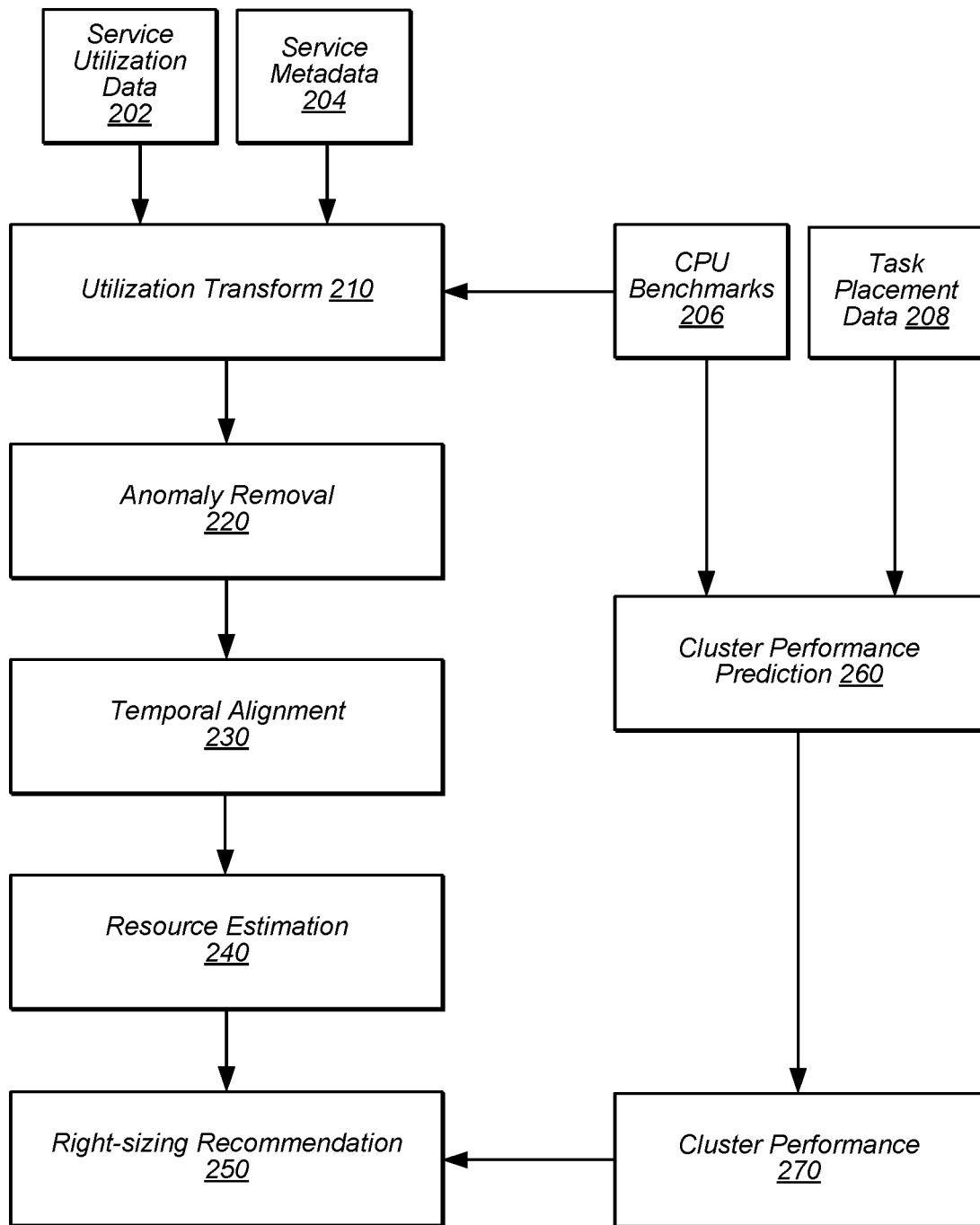
FIG. 2 is a process chart that illustrates a process for determining right-sizing recommendations for applications executing on a compute cluster of variable size, according to at least some embodiments.

FIG. 2 is a process chart that illustrates a process for determining right-sizing recommendations for applications executing on a compute cluster of variable size, according to at least some embodiments. Service utilization data 202 and service metadata 204 for an application executing on a compute cluster such as the compute cluster 122 of FIG. 1, along with CPU benchmarks 206, may be obtained, such as from performance metrics 126 as shown in FIG. 1, in some embodiments. As the compute cluster may include heterogenous instances, tasks from the same service may be hosted on instances with different performance, especially CPU performance. To adjust utilization for heterogeneous instances, CPU benchmarks 206, may be employed to generate normalized utilization data at utilization transform 210. These CPU benchmarks 206 may be acquired by running standard benchmarks such as SPECInt tests on different instances, although this is merely one example and any number of benchmark implementations may be envisioned. These benchmarking values indicate CPU performance of different instances and may be used to transform utilization of different tasks. After this transformation, the effect of heterogenous instances may be eliminated such that utilizations from different tasks may be compared and aggregated together, in some embodiments.

To avoid impact from noise or outliers, anomaly removal 200 may process the normalized utilization data, in some embodiments. This may be performed at an individual task level such that tasks showing different usage patterns from most of their peers may be identified and removed from evaluation.

Then, the normalized utilization data for all identified and non-anomalous tasks may be temporally aligned, in some embodiments. Temporal alignment of utilization time series data from the multiple tasks, as contained in the service utilization data 202, may be implemented using Constrained Dynamic Time Wrapping (CDTW) with backtracking, in some embodiments. This results in a set of data points for each phase of multiple execution phases of the application, thus mitigating potential asynchronous event issues which may show similar task usage without being aligned in time. The result of temporal alignment 230 may be a set of timestamps within an anchor time series selected from among the time series data of the non-anomalous instances.

To pick optimal resource sizes, resource demand must be next determined. In some embodiments, different execution conditions may be considered for resource estimation 240. Further details of resource estimation 240 are discussed below in FIG. 4. A first execution condition may target a compute cluster of relatively small size. In this execution condition, for each phase, an average and maximum resource sizes value for each resource may be determined, in some embodiments. This generates two aggregated time series, where for each time series, utilizations may be predicted over a period of usage and execution time, for example, over hours, days or weeks. The maximum value of predicted utilization for a resource is then assigned as the needed size for that resource. A larger value of the two time series candidates mat then be chosen as final estimation, in some embodiments.

A second execution condition may target a compute cluster of relatively large size. In this execution condition, for each phase a prior distribution may be used to model a utilization distribution, in some embodiments. For example, a 95% confidence interval may be constructed with the prior distribution and the upper bound is then extracted for each phase, in some embodiments. It should be understood that this is merely one example, and other uses of prior distributions to develop a model of utilization distribution may be envisioned. A maximum upper bound for all phases may then be selected to determine resource sizes, in various embodiments.

A third execution condition may target automatic application of the recommendation, resulting in rapid deployment of cluster tuning, in some embodiments. In this execution condition, for each phase, average resource utilization values may be extracted, resulting in an aggregated time series. These utilization values may be converted to discrete quantities with a finite number of states, e.g. 10 states and 10% each. A transition probability may then be modeled using a Markov Chain, in some embodiments. This model may be used to predict future states of individual tasks, in a short window such as a single day. The recommendation may then be updated or the predicted states reverted by the upper bound of 95% confidence interval based on utilization datapoints in each state as described above with regard to the second execution condition.

Tasks of the application may execute on a compute cluster managed by a client. This compute cluster may have one or many instance types, hence it may present heterogeneous cluster issues. CPU performance may be different for tasks because they are hosted on different instances in the cluster. Individual instances of the cluster, using task placement data 208, may be evaluated to identify an instance with worst-case resource utilization to generate cluster performance data 270. Using this cluster performance data 270 and the estimated resource sizes, a right-sizing recommendation 250 that may safely run the current workload and achieve maximum saving savings in cluster cost to the client.

FIG. 3 is a process flow diagram that illustrates a process for determining right-sizing recommendations for applications executing on a compute cluster of variable size, according to at least some embodiments. The process begins at 300 where perfomance metrics, such as service utilization data 202, service metadata 204 and CPU benchmarks 206 as shown in FIG. 2, may be collected for heterogeneous nodes of a computer cluster or scaling group that executes an application. The performance metrics may include time series data and resource utilization data as well as CPU benchmark data used to normalize results of the heterogeneous nodes as shown in 310.

The resulting normalized metrics may be analyzed to exclude nodes 320 showing different usage patterns from most of their peers, resulting in the identification of normalized service utilization data at one or more of the heterogeneous nodes as indicative of node utilization for the application, in some embodiments.

The indicative data of the remaining nodes may then be temporally aligned as shown in 330. Temporal alignment of utilization time series data from multiple tasks may be implemented using Constrained Dynamic Time Wrapping (CDTW) with backtracking, in some embodiments. This results in a set of data points for each phase of multiple execution phases of the application, thus mitigating potential asynchronous event issues which may show similar task usage without being aligned in time. The result of temporal alignment 330 may be a set of timestamps within an anchor time series selected from among the time series data of the non-anomalous instances, in some embodiments.

Resource demand may be next determined to identify required resource sizes for various phases of execution of the application, as shown in 340, in some embodiments, Different execution conditions may be considered for resource estimation. This process is discussed further below in FIG. 4.

Tasks of the application may execute on a compute cluster managed by a client. This compute cluster may have one or many instance types, hence it may present heterogeneous cluster issues. CPU performance may be different for tasks because they are hosted on different instances in the cluster. Individual instances of the cluster, using task placement data, may be evaluated to identify an instance with worst-case resource utilization to generate cluster performance data, as shown in 350.

As shown in 360, the resulting cluster performance data and the estimated resource sizes from 340 may be used to determine a right-sizing recommendation, such as the right-sizing recommendation 250 of FIG. 2, that may safely run the current workload and achieve maximum saving savings in cluster cost to the client. This right-sizing recommendation may be returned to a requestor, such as a client or other service as discussed below in FIG. 19, for further action or may be automatically applied to right-size the compute cluster.

Figure 4:
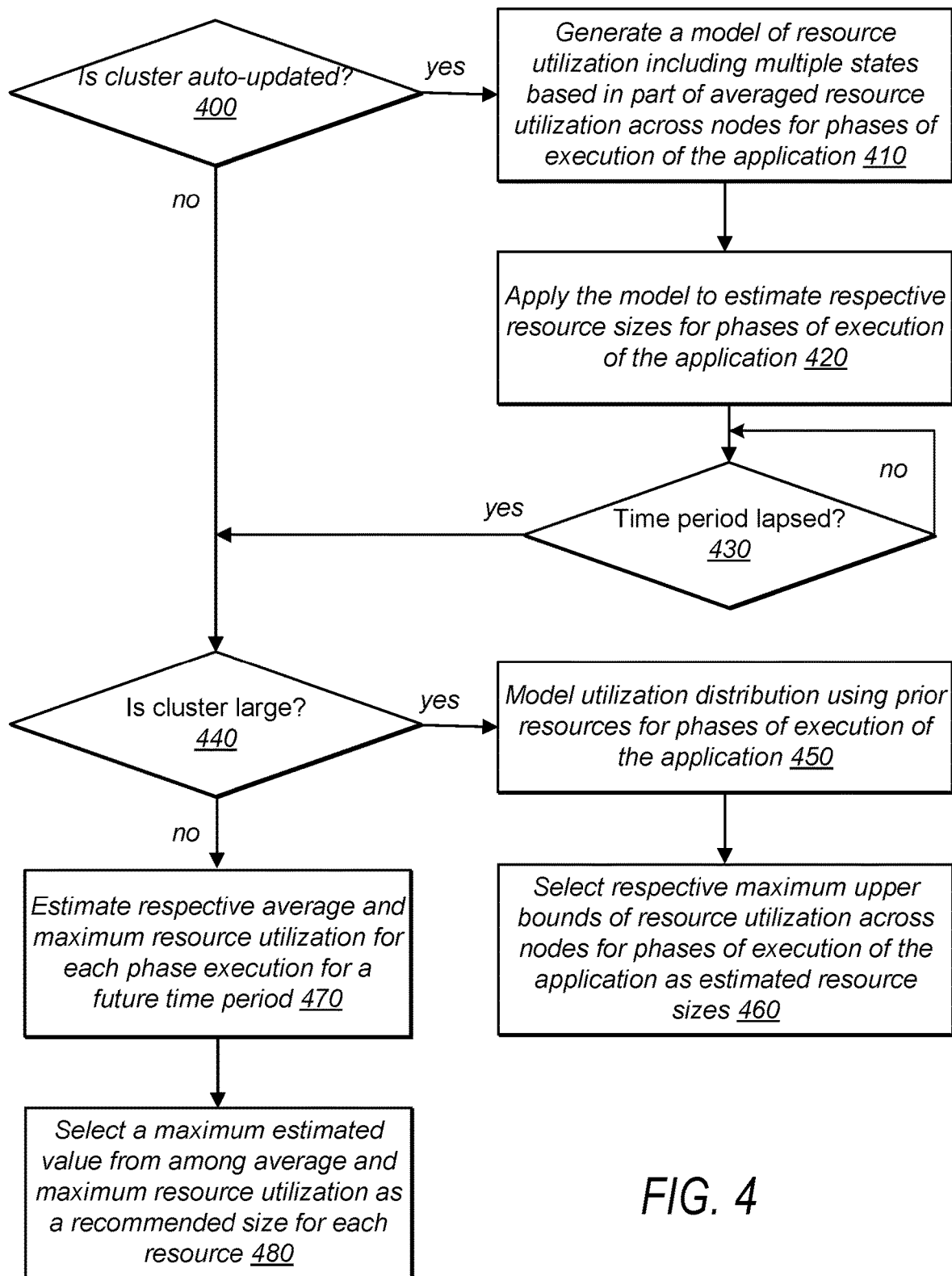
FIG. 4 is a process flow diagram that illustrates a process for determining resource sizes for applications executing on a compute cluster of variable size, according to at least some embodiments.

FIG. 4 is a process flow diagram that illustrates a process for determining resource sizes for applications executing on a compute cluster of variable size, according to at least some embodiments. To pick optimal resource sizes, different execution conditions may be considered. If a compute cluster is to be auto-updated with a recommendation based on the determined resource sizes, as shown in a positive exit from 400, the process may advance to 410. If a compute cluster is not to be auto-updated with a recommendation based on the determined resource sizes, as shown in a negative exit from 400, the process may advance to 440.

As shown in 410, an execution condition may target automatic application of a recommendation, resulting in rapid deployment of cluster tuning, in some embodiments. In this execution condition, for each phase, average resource utilization values may be extracted, resulting in an aggregated time series. These utilization values may be converted to discrete quantities with a finite number of states, e.g. 10 states and 10% each. A transition probability may then be modeled using a Markov Chain, in some embodiments.

As shown in 420, this model may then be applied to predict future states of individual tasks in order to estimate respective resource sizes for phases of execution of the application, in various embodiments. This modeling may be suitable for estimation for short time periods such as a single day. If such as time period has lapsed, as shown in a positive exit from 430, the process may advance to 440. If such as time period has not lapsed, as shown in a negative exit from 430, the process may wait by returning to 430.

If the compute cluster providing performance metrics is relatively large, as shown in a positive exit from 440, the process may advance to 450. Different threshold cluster sizes may be used in this determination, in various embodiments. For example, clusters having more than thirty nodes may be considered large while clusters of thirty or less nodes may be considered small. This is merely one example and other thresholds may be employed based on evaluation performance and resource usage as well as estimation accuracy, in various embodiments. If the compute cluster providing performance metrics is relatively small, as shown in a negative exit from 440, the process may advance to 470.

As shown in 450, an execution condition may target a compute cluster of relatively large size. In this execution condition, for each phase a prior distribution may be used to model a utilization distribution, in some embodiments. For example, a 95% confidence interval may be constructed with the prior distribution and the upper bound is then extracted for each phase, in some embodiments. It should be understood that this is merely one example, and other uses of prior distributions to develop a model of utilization distribution may be envisioned. A maximum upper bound for all phases may then be selected to determine resource sizes, in various embodiments, as shown in 460.

As shown in 470, an execution condition may target a compute cluster of relatively small size. In this execution condition, for each phase, an average and maximum resource size value for each resource may be estimated, in some embodiments. This may generate two aggregated time series, where for each time series, utilizations may be predicted over a period of usage and execution time, for example, over hours, days or weeks. Then as shown in 480, a maximum value of predicted utilization for each resource is then assigned as the needed size for that resource. A larger value of the two time series candidates mat then be chosen as final estimation, in some embodiments.

Various embodiments of methods and systems implement combined active and pre-initialized resource management for rapid auto-scaling. In some embodiments, auto-scaling utilizes pre-initialized instances (sometimes referred to as "pre-warmed instances") to address a "cold start problem" (e.g., unacceptably long pre-initialization times that can slow scale-up of a group of instances). For example, a system may implement an interface that allows customers to configure a size for a data structure (e.g., a buffer, queue, deque (double-ended queue) or the like) that identifies a quantity of pre-initialized compute instances for scaling the group of active compute instances of pre-warmed (sometimes referred to herein as "pre-initialized") instances to be used to more quickly scale-up the group. Additionally, disclosed are various different implementations of techniques to manage the size of the collection of pre-initialized instances. For example, generally when scaling up a group, a pre-initialized instance is moved from the collection of pre-initialized instances for that group to the group and the data structure (e.g., a deque, queue, etc.) is immediately replenished with an identifier of new pre-initialized instance, in various embodiments. However, other embodiments without replenishment are disclosed herein.

When scaling up (e.g., using reactive auto-scaling, due to dynamically identified conditions or otherwise) a pre-initialization time may be unacceptably long, as it may add risk to availability. For example, a pre-initialization time for adding an instance into a group may be high due to a relatively high number of operations that need to be performed on a standard host before it is capable of servicing traffic for the group. In some embodiments, predictive auto scaling can improve upon reactive auto-scaling. But even predictive auto scaling may be imperfect as prediction may be error-prone (e.g., prediction may not correctly predict intermittent spikes in traffic, or the data that serves as a basis for the prediction is only loosely-correlated, etc.). Described herein are approaches to significantly reduce the a pre-initialization time when adding hosts to groups, to thereby increase the usability of auto scaling.

Throughout the disclosure, reference is sometimes made to a particular type of group-auto-scaling groups (ASGs)—but the techniques herein are equally applicable to the more general category of groups of instances in general, as well.

One example technique (e.g., a scale-up-rate technique) for managing the collections of pre-initialized instances tracked by the data structure includes a monitoring system that monitors the historical scale-up rate for the particular group of instances and adjusts the size of the collection of pre-initialized instances for that group based on the monitored scale-up rate and based on the instance pre-initialization time (e.g., MTTT or other measure) for instances for that group. The monitored scale-up rate may come from any of various sources, such as, but not limited to, a configuration parameter, from metrics collected from some other group, from analysis of the group to which the rate is applied, etc. Example benefits may include a more optimized sizing of the deque so that resources are not wasted on more pre-initialized instances than needed for a particular group. Another example benefit is automated adaptation of the size of the deque as scaling demands on the group change over time (e.g., as MTTT changes over time, as traffic volume changes, etc.).

A second technique for managing the data structure tracking the collection of pre-initialized instances is sometimes referred to herein as the assigned-but-unused-size technique that is used to set the data structure size. For some embodiments of this technique, a total instance quantity is preconfigured for the total number of instances assigned to both the group and the group's collection of pre-initialized instances. As the size of the group scales up, the size of the data structure scales down, for example. The data structure is not replenished when the group scales up as in the first technique, but does expand when the group scales down in some embodiments (unlike the first technique, for example). In some embodiments, the size of the data structure always corresponds to the total number of assigned instances minus the number of instances currently active in the group (an assigned instance is an instance associated with a group, irrespective of whether the instances are processing requests, in some embodiments). In some embodiments, the size of the deque ebbs and flows with the scaling, as opposed to being resized based on monitoring scale-up rates over time. The preconfigured total instance size for the data structure plus the group may be set by the customer, or perhaps by the system based on knowledge of past scaling rates for instances of the same type as in the group, in some embodiments. But in that case, the size is not repeatedly updated as in the rate-based technique, for example. A bound may be placed on the total size of the group of instances plus the corresponding collection of pre-initialized instances for the group, if desired, for some embodiments.

Also disclosed is an embodiment with an additional "buffer amount" of pre-initialized instances in the data structure to provide a safety margin for burst scaling, which may be further enhanced by transferring instances between data structures of different groups of instances in some cases (e.g., sharing pre-initialized instances among different groups). Being able to share instances from one group or data structure to another may reduce or eliminate the need to maintain reserve "cold" instances in a common pool, and may allow for faster pre-initialization in some cases.

Auto-scaling and Scaling Policies

Generally, scaling includes the ability to increase or decrease the compute capacity of an application. Scaling starts with an event, or scaling action, which instructs an auto scaling group to either launch or terminate instances (e.g., virtual or non-virtual instances or combinations thereof) in some embodiments. Auto scaling provides a number of ways to adjust scaling to best meet the needs of applications.

In some embodiments, configuration settings for dynamic scaling define how to scale the capacity of a group (e.g., an auto scaling group or other group) in response to changing demand. For example, a web application currently runs on two instances, and it is desirable or the CPU utilization of the auto scaling group to stay at around 50 percent when the load on the application changes. This would provide extra capacity to handle traffic spikes without maintaining an excessive number of idle resources. An auto scaling group may be configured to scale dynamically to meet this need by defining a scaling policy that the system relies on to scale-up an auto scaling group (add more instances) to deal with high demand at peak times, and scale-down a group (run fewer instances) to reduce costs during periods of low utilization.

In some embodiments, a scaling policy instructs a scaling service to track specific metrics, and it defines what action to take in case of a corresponding alarm The metrics that are used to trigger an alarm (or to trigger calculation of a size of a data structure that tracks pre-initialized instances or the like, etc.) are an aggregation of metrics coming from all of the instances in the auto scaling group. For example, take an auto scaling group with two instances, where one instance is at 60 percent CPU and the other is at 40 percent CPU. On average, they are at 50 percent CPU. When the policy is in effect, auto scaling adjusts the group's desired capacity up or down when the alarm is triggered, for example.

When a scaling policy is executed, if the capacity calculation produces a number outside of the minimum and maximum size range of the group, auto scaling ensures that the new capacity never goes outside of the minimum and maximum size limits, in some embodiments.

Pre-initialized Instances

In some embodiments, an instance that has completed the pre-initialization process and is fully initialized for serving traffic for the group, but is not assigned to process traffic or requests, is a pre-initialized instance. The instance may be referred to as pre-initialized as it is initialized before it is needed to process traffic, in some embodiments. Pre-initialization includes but is not limited to pulling all required packages and starting up all required services, for example. In some embodiments, no traffic is directed to the pre-initialized instance. This is achieved by making the instance ready, but not directing traffic to it, for example, by not adding the instance to a group request router, or load balancer, etc. for which the instance would process traffic (e.g., by not enabling the address for the request router, for example). In some embodiments, groups are associated with, or assigned to respective collections (e.g., queues or deques, etc.) of pre-initialized instances that are assigned to, but not used by the ASG (e.g., a request router is not sending the pre-initialized instances of the group traffic to process). Once a pre-initialized instance is activated-added to the ASG group to process request traffic, it is an ASG group member, and no longer a pre-initialized instance member of the collection of pre-initialized instances tracked by the data structure, as it is now receiving traffic, for example.

In some embodiments, the life cycle of a pre-initialized instance may be unique from other instances. For example, scaling-down of an auto-scaling group (ASG) removes instances from the ASG, not pre-initialized instances. In some embodiments, each ASG is associated with a deque (or a queue, or the like, depending on implementation) of pre-initialized instances. Not all entries in the deque are necessarily fully pre-initialized and may be in various different states of pre-initialization at any given time. Generally, an identifier of an instance is placed into a deque at about the same time (before or after) the pre-initialization of the instance begins. As the deque may hold a quantity of identifiers of various instances that began pre-initialization at various times, those instances may be in varying states of pre-initialization (e.g., anywhere from an early-in-the-pre-initialization-process state to fully-initialized-and-waiting-to-be-assigned-traffic state, etc.). Generally, as described herein, pre-initialized instances with identifiers towards the front of the deque have completed more of the pre-initialization process than instances with identifiers towards the back of the deque. For example, identifiers of instances that have yet to be initialized are added to the back of the deque, whereas instances being scaled-down from the ASG (already initialized) may be placed at the front of the deque, if there is space. Generally, pre-initialized instances in the front of the deque are the first ones moved into the ASG as they are more likely to be fully-initialized, and more readily-available to process request traffic.

An ASG may have a maximum active instance parameter and a desired active instance parameter, in some embodiments. In some embodiments, keeping pre-initialized instances in a deque, instead of adding them to the ASG, prevents the ASG from being overloaded with hosts (under-utilization of resources). Also, in some embodiments, pre-initialized instances from individual deques may be shared across ASGs. For example, if a first deque of a first ASG is empty (or if instances are not fully initialized yet), and instances are not available from a common pool of instances, the first ASG may request to use an unused pre-initialized instance from a second deque associated with a second ASG. In some embodiments, a buffer of pre-initialized instances associated with an ASG may be used by other ASGs. For example, some techniques may include adding a buffer amount (e.g., some percentage or the like) in the calculation of the deque size to ensure there are extra pre-initialized instances for unexpected bursts in traffic or for unexpected failures.

Figure 5:
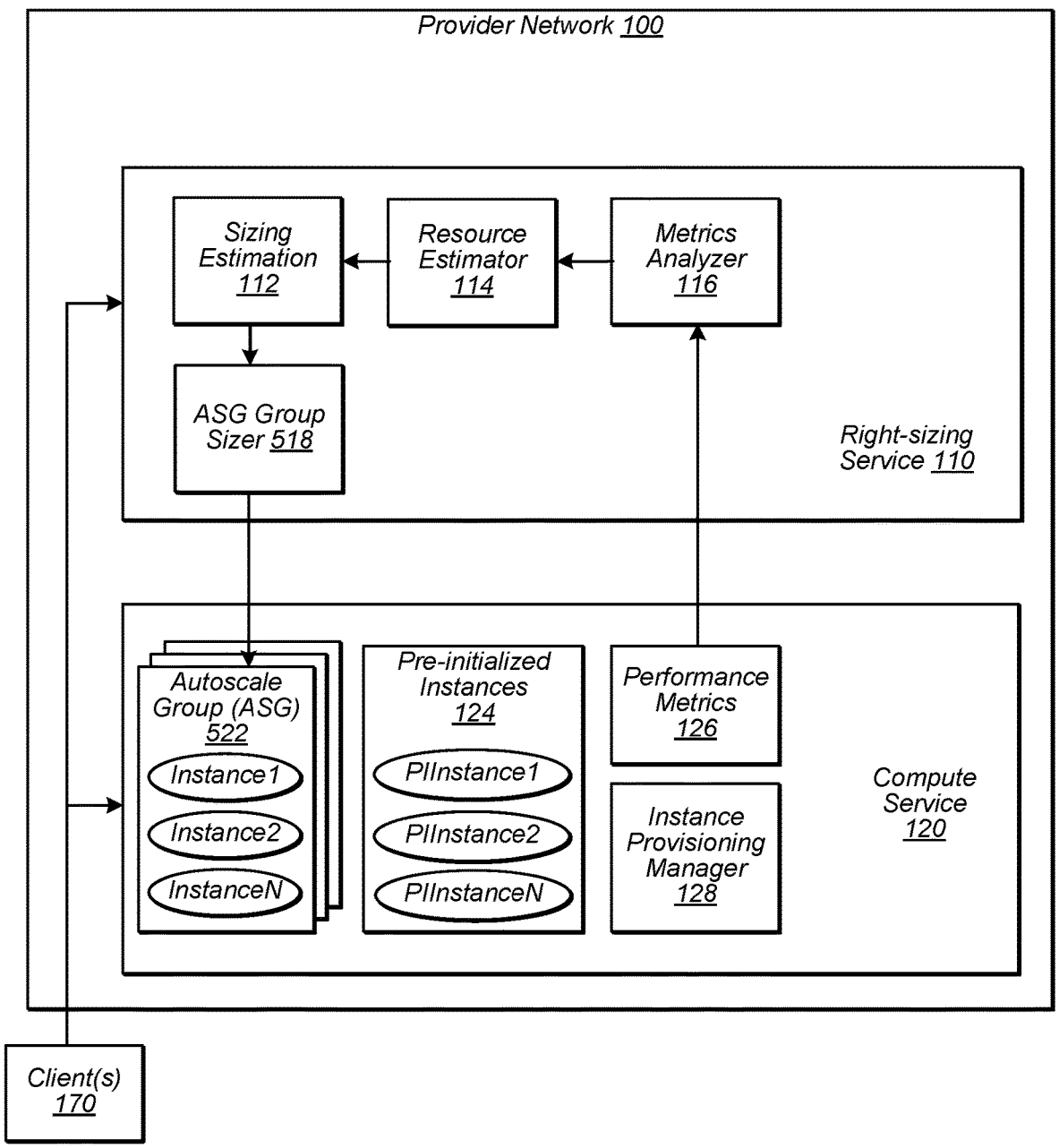
FIG. 5 is a block diagram of an architecture for a system that implements automatic task right-sizing for auto-scaling groups of compute clusters, according to at least some embodiments.

FIG. 5 is a block diagram of an architecture for a system that implements automatic task right-sizing for auto-scaling groups of compute clusters, according to at least some embodiments. Various components illustrated in FIG. 5 may perform functionality illustrated in FIGS. 18 and 19, as described below.

Illustrated is a Provider Network 100 that may include various services including a Compute Service 120 and a Right-sizing Service 110. The Compute Service 120 may include an instance provisioning manager 128, an auto-scaling group (ASG) 522 and pre-initialized compute instances 124. Instances as referred to herein may include virtual instances or physical instances or systems with various combinations thereof, in some embodiments. Instance provisioning manager 128 may manage the provisioning of compute instances of the compute service. For example, the instance provisioning manager 128 may use pre-initialized instances 124, such as PIInstance1-PIInstanceN, to create, tune and maintain ASG 522 by adding, increasing, subtracting and/or decreasing instances such as Instance1-InstanceN from the ASG. The instance provisioning manager 128 may perform these tasks automatically or upon request from client(s) 170. It should be understood that a compute cluster may include a collection of the same or similar instances in some embodiments while in other embodiments heterogeneous instances differing in available computing resources such as processor and memory resources may be employed.

For example, a client 170 may request that the instance provisioning manager provide instances to be pre-initialized and/or may request that the provisioning manager pre-initialize the instances. In some embodiments, compute service 150 may implement, manage and provide an API for accessing a fleet of compute instances. At least some of the fleet of compute instances may form one or more common pools of instances. Various different pools of instances may be grouped based on the underlying resources of the instances, in some embodiments. Instances from a common pool may be provided in response to clients that request an instance (e.g., other services of a service provider may be clients that request the instance, etc.).

Clients 170, external and/or internal (not shown) to the compute service 120, may request compute cluster(s) 122, execute applications on a ASG 522 and request a right-sizing service 110 to provide recommendations on resource sizing for ASG 522. To generate a resource sizing recommendation, the right-sizing service 110 may obtain various performance metrics 126 from the compute service 120. These metrics may include performance data and time series data related to execution of an application on various instances of ASG 522. In addition, the performance metrics may include benchmarking data for various instances of the compute cluster 122 and various metadata regarding the configuration of the ASG 522 as well as relevant application metadata useful to analyze performance of the application on the ASG 522.

Figure 18:
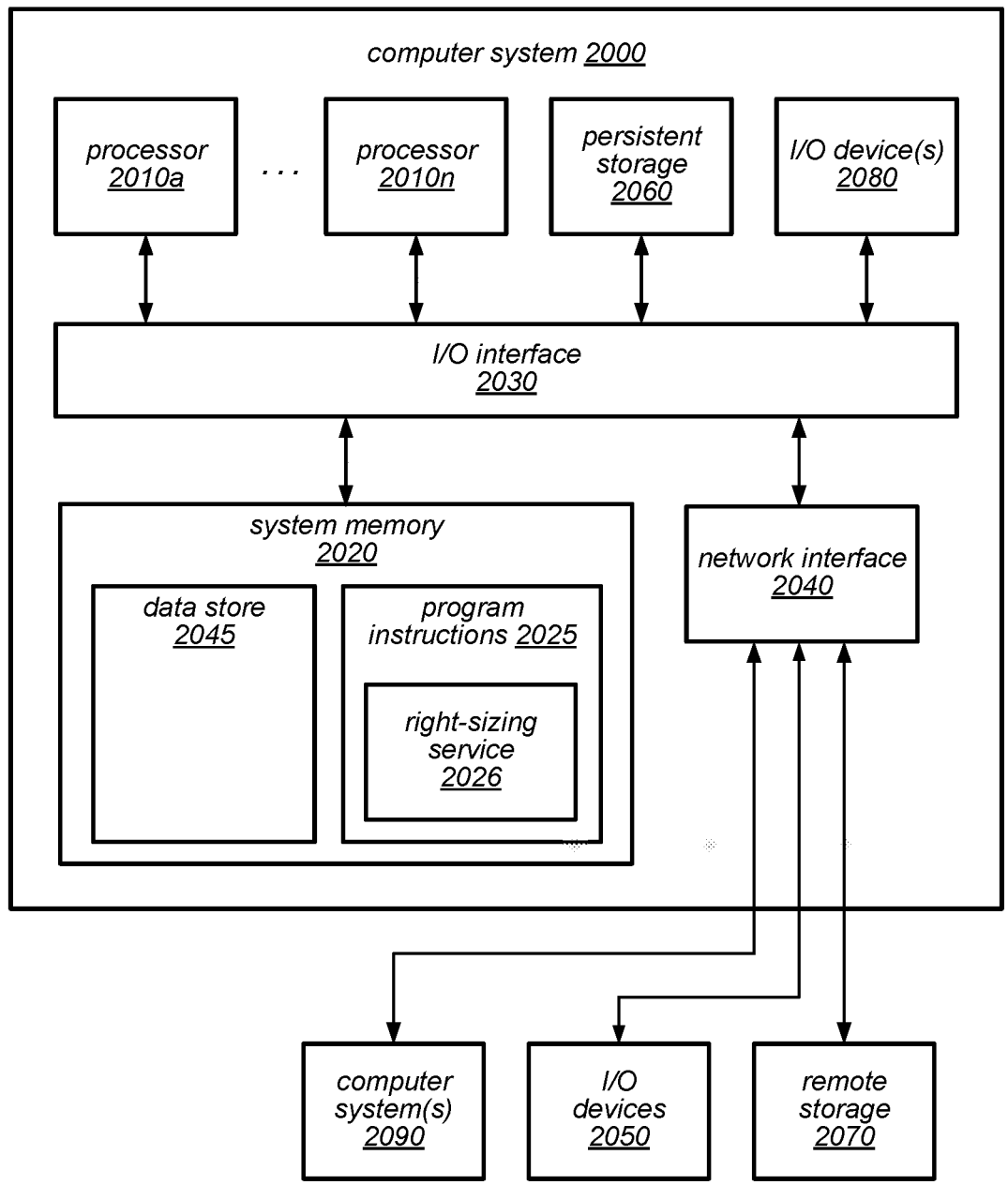
FIG. 18 is a block diagram illustrating an example computer system that may be used in some embodiments of a system that implements combined active and pre-initialized resource management for rapid auto-scaling, according to at least some embodiments.

A metrics analyzer 116 may use these performance metrics to generate normalized metrics describing execution of various phases of the application, as discussed later in FIGS. 18 and 19. These normalized metrics may then be used by a resource estimator 114 to generate an estimated resource sizes to optimize performance of individual nodes of a cluster 122 in performing the application. These resource estimates may then be used in combination with cluster performance predictions to generate recommended instance counts and resource sizes for the ASG 522. A post-processing step to adjust the resource sizes to remain within the capacity of ASG instances and instance counts may also be employed. After this post-processing, a right-sizing recommendation may be generated for the ASG at ASG group sizer 518, with the recommendation provided to the client 170 or automatically applied to the compute cluster 122.

Furthermore, in some embodiments, a compute service 120 may employ multiple ASGs of different instance counts and processing capabilities. A right-sizing recommendation, in these embodiments, may then be used to select among different ASGs rather than tune or reconfigure an existing ASG. Furthermore, a client may employ an ASG to execute more than one application, in some embodiments. In this case, a sizing estimation 112 may be generated for each of the multiple applications of the client, and the ASG group sizer 518 may then generate a right-sizing recommendation for a set of resources sized according to respective sums of resource size estimates for the respective applications, in various embodiments.

FIGS. 6-9 illustrate various functionality associated with instances in various states. The key illustrates an ASG instance (an active instance of an auto-scale group 522 receiving traffic from a request router 160 (ASG-Instance)) with a lightly-dotted pattern. The key illustrates a pre-initialized instance having a state of initialization incomplete (ASG-PI-Instance (initialization not complete)) as a clear pattern, illustrates an incompletely-initialized instance as clear or white, and illustrates a pre-initialized instance having a state of initialization of complete (ASG-PI-Instance (initialization complete)) as a heavily-dotted pattern. Generally, a deque is illustrated as the rectangle on the left side of the circle, and the ASG is illustrated as the right side of the circle.

Figure 6:
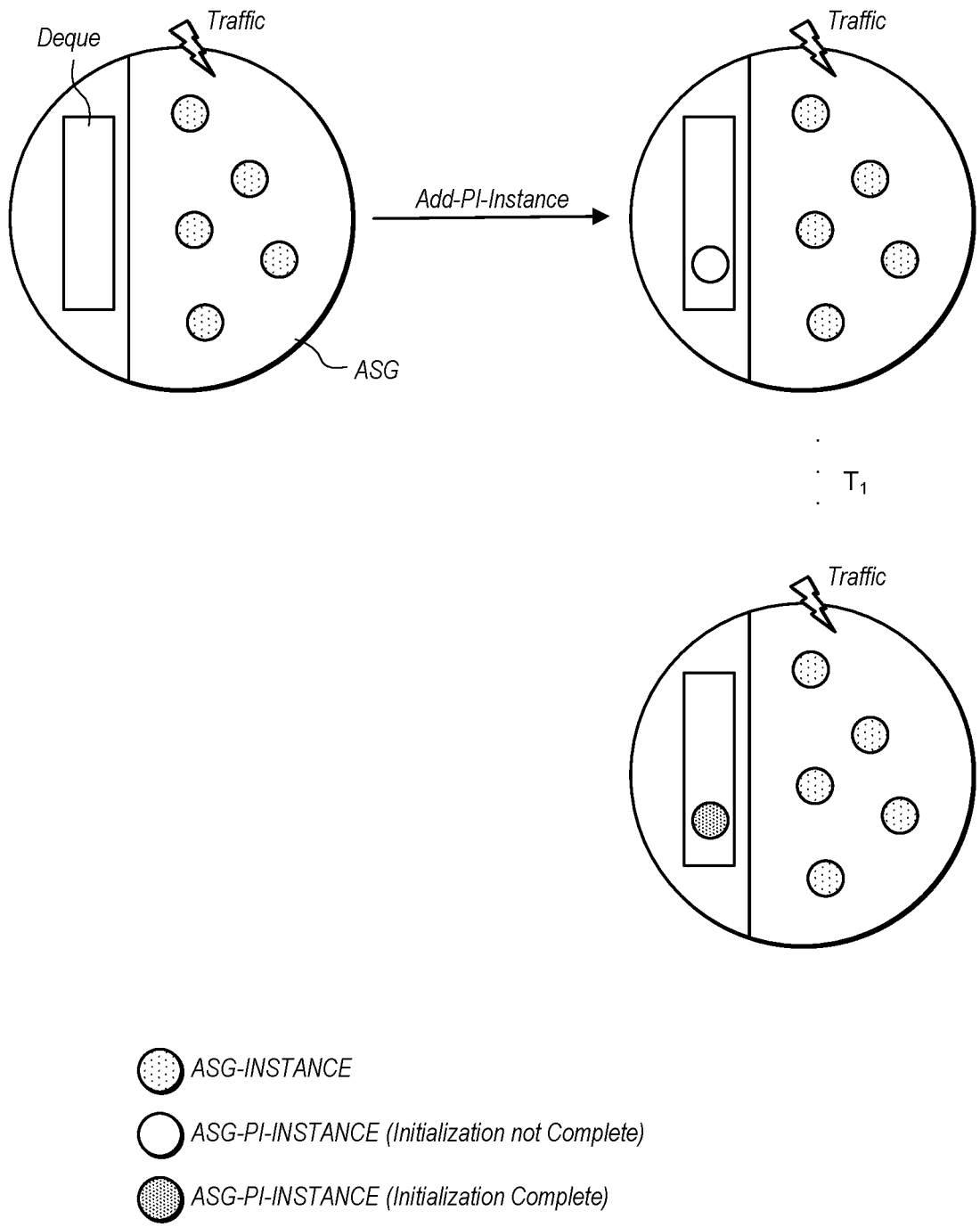
FIG. 6 is a diagram illustrating the add-pre-initialized-instance functionality for a system that implements combined active and pre-initialized resource management for rapid auto-scaling, according to at least some embodiments.

FIG. 6 is a diagram illustrating the add-pre-initialized-instance functionality (e.g., an application programming interface (API)) for a system that implements combined active and pre-initialized resource management for rapid auto-scaling, according to at least some embodiments. In the illustrated embodiment, the API adds a new instance to the back of the ASG deque and initializes that instance as a pre-initialized instance (e.g., according to the process illustrated in FIG. 7, or similar). The lower circle indicates that after a pre-initialization time T1 (sometimes measured as mean time to traffic (MTTT)) or otherwise) the instance initialization is complete.

Figure 7:
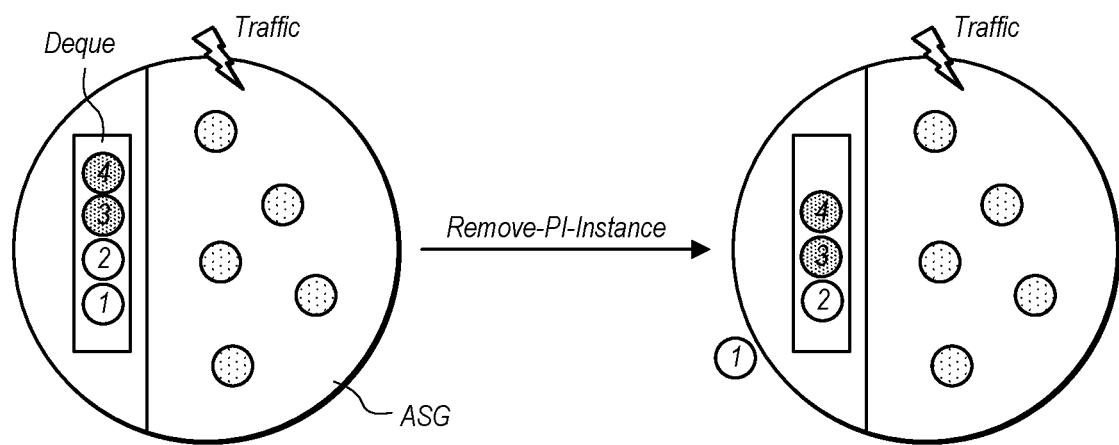
FIG. 7 is a diagram illustrating the remove-pre-initialized-instance-from-deque functionality for a system that implements combined active and pre-initialized resource management for rapid auto-scaling, according to at least some embodiments.
Figure 10:
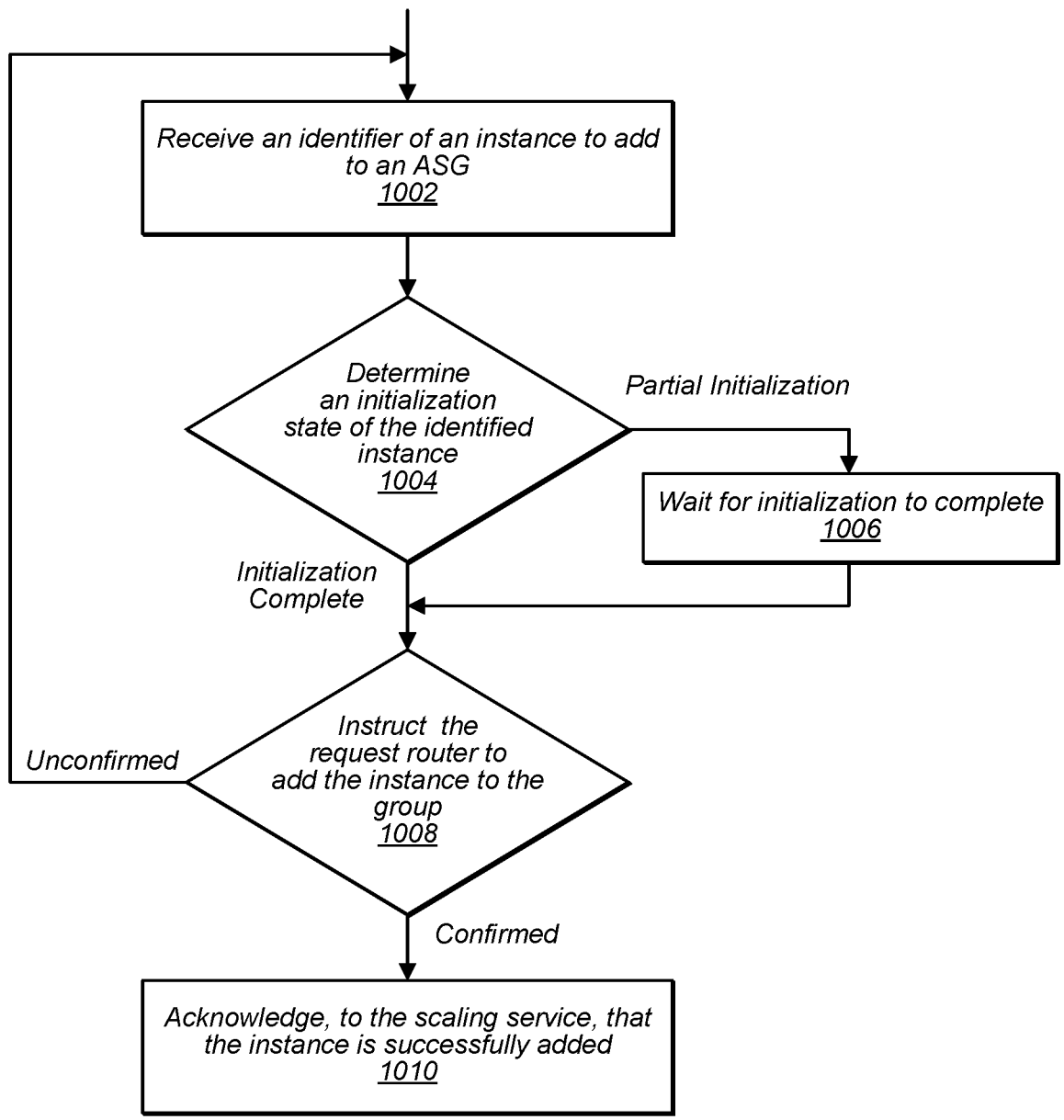
FIG. 10 is a flow diagram that illustrates adding pre-initialized instances specified by a data structure to a group of instances, for a system that implements combined active and pre-initialized resource management for rapid auto-scaling, according to at least some embodiments.

FIG. 7 is a diagram illustrating the remove-pre-initialized-instance-from-deque functionality (e.g., an application programming interface (API)) for a system that implements combined active and pre-initialized resource management for rapid auto-scaling, according to at least some embodiments. FIG. 10 illustrates removing an instance from a deque (and returning it to the general pool or some other place, such as to a deque of another ASG that needs an instance, for example). Such a process may be performed when the deque length is made shorter, in FIG. 6 at 614, for example. In the illustrated embodiment, an incompletely-initialized instance is removed from the deque, instead of a completely-initialized instance.

Figure 8A:
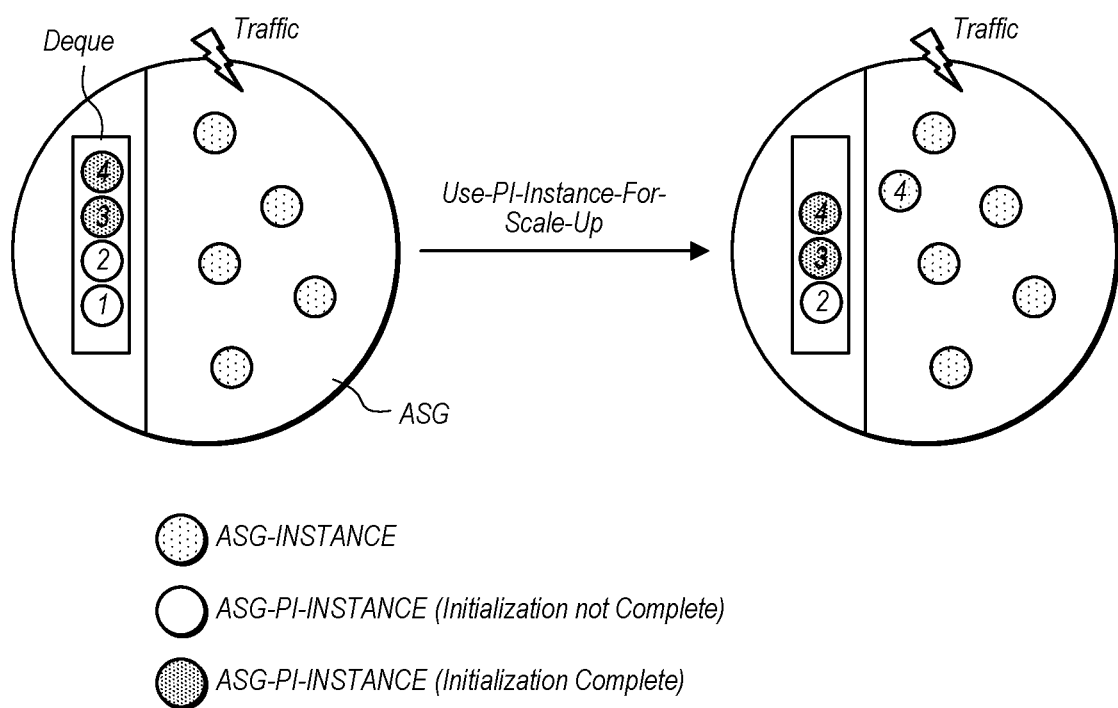
FIGS. 8A and 8B are diagrams illustrating the use-pre-initialized-instance-for-scale-up functionality for a system that implements combined active and pre-initialized resource management for rapid auto-scaling, according to at least some embodiments.
Figure 8B:
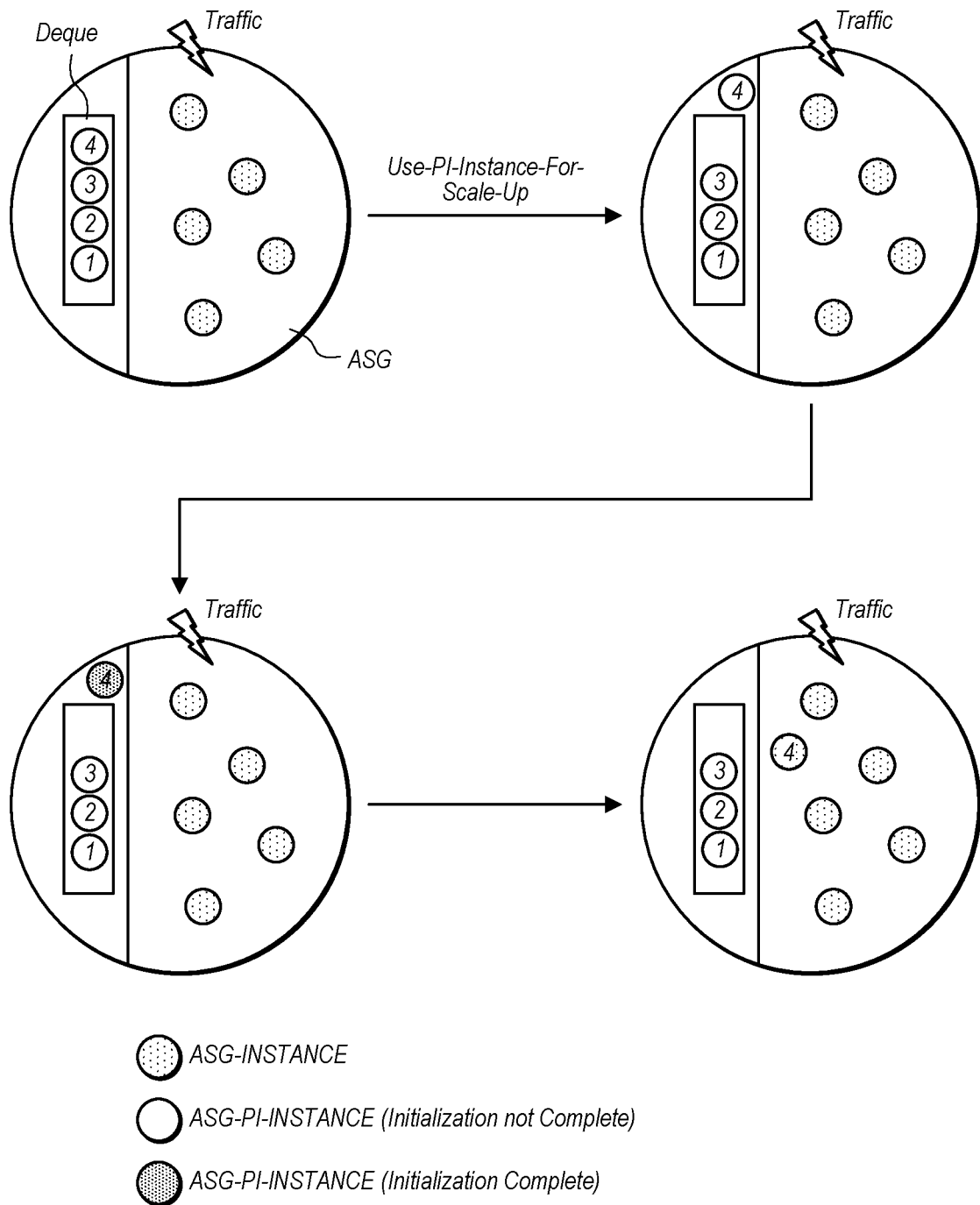

FIGS. 8A and 8B are diagrams illustrating the use-pre-initialized-instance-for-scale-up functionality (e.g., an application programming interface (API)) for a system that implements combined active and pre-initialized resource management for rapid auto-scaling, according to at least some embodiments. FIG. 8A illustrates what happens in FIG. 10 below for the case where the instance comes from the front of the deque and is already fully pre-initialized, for example.

FIG. 8B illustrates, in the case of the use-pre-initialized-instance-for-scale-up case, what happens for the case where the instance comes from the front of the deque and is not fully pre-initialized (e.g., FIG. 10, block 1006). If initialization is not complete, activation (instructing the request router to send traffic to the instance) involves (1) waiting for the instance to initialize (illustrated as circle 4 outside the deque, but not in the ASG either), (2) adding the instance to the request router, and (3) performing sanity checks (e.g., the request router may make sure the instance is addressable and can process traffic, or the like, etc.). In some of these cases, MTTT may take longer for the incompletely-initialized instances in the deque. In some embodiments, if the deque is empty, the algorithm for scaling up of an ASG using a non-pre-initialized instance may be used, although some implementations may send all instances through the deque.

Figure 9:
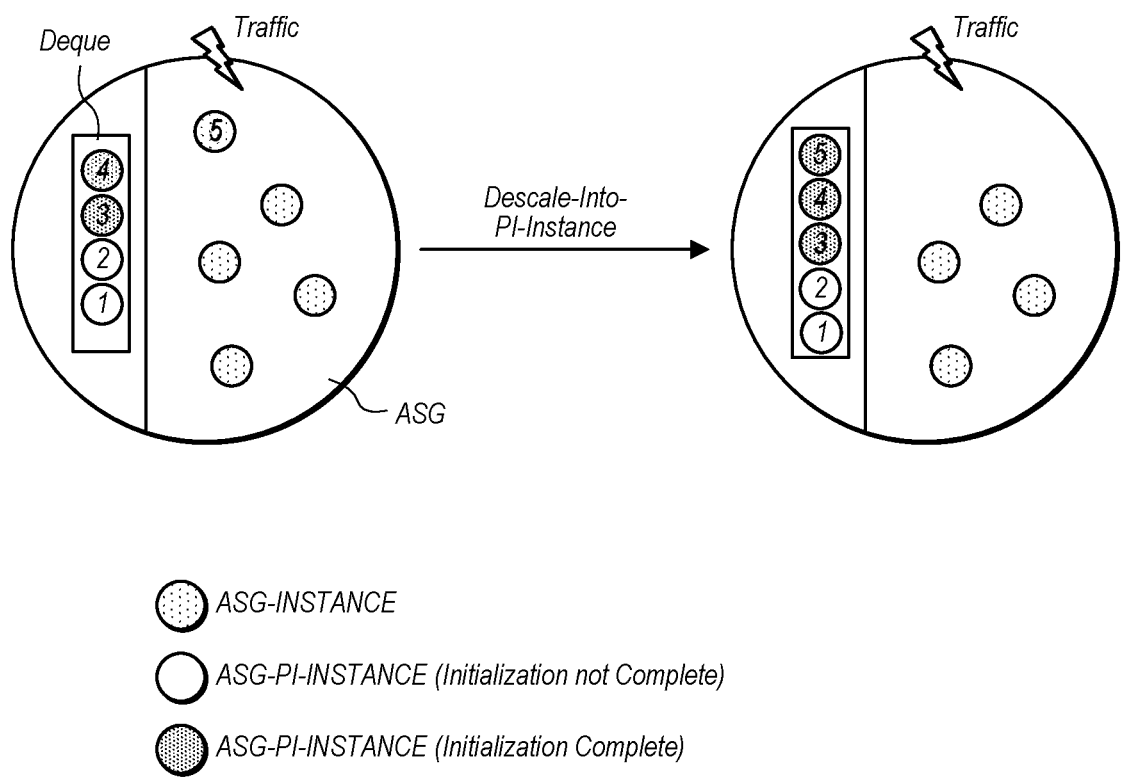
FIG. 9 is a diagram illustrating the descale-into-pre-initialized-instance functionality for a system that implements combined active and pre-initialized resource management for rapid auto-scaling, according to at least some embodiments.

FIG. 9 is a diagram illustrating the Descale-into-pre-initialized-instance functionality for a system that implements combined active and pre-initialized resource management for rapid auto-scaling, according to at least some embodiments. FIG. 9 illustrates the case of down-scaling into the front of the deque (the system may or may not have to instruct expanding the size of deque to do this). FIG. 9 could be illustrative of either of the down scale embodiments, depending on the circumstances.

FIG. 10 is a process flow diagram that illustrates adding pre-initialized instances specified by a deque to an auto scaling group (ASG), for a system that implements combined active and pre-initialized resource management for rapid auto-scaling, according to at least some embodiments. The process may be performed by one or more components of scaling manager, in some embodiments.

At block 1002, an identifier of an instance to be added to an ASG is received. For example, for a scaling operation, a scaling control manager may determine to scale an ASG, such as the ASG 522 of FIG. 5. An identifier for pre-initialized instance, such as PIInstance1 of FIG. 5, may be obtained by the scaling control manager to identify an instance to add to the ASG. In at least the illustrated embodiment, an initialization state for the identified instance may be determined (block 1004). For example, scaling manager may ask for the state of the identified pre-initialized instance. For a partially-initialized pre-initialized instance the scaling manager may wait for initialization to complete (block 1006). In either case, a corresponding request router is instructed to add the instance to the ASG (block 1008), by the scaling control manager, for example. In some implementations, the request router may perform a sanity check for the instance (e.g., making sure the instance is addressable and can process traffic) and confirm back to the scaling control manager that the instance passed the sanity checks. At block 1010 an acknowledgement is sent to the scaling control manager that the instance has been successfully added to the ASG. In the case where the sanity check fails, the process may return to block 1002, and repeat until successful, and/or send an error message, in some embodiments.

Figure 11:
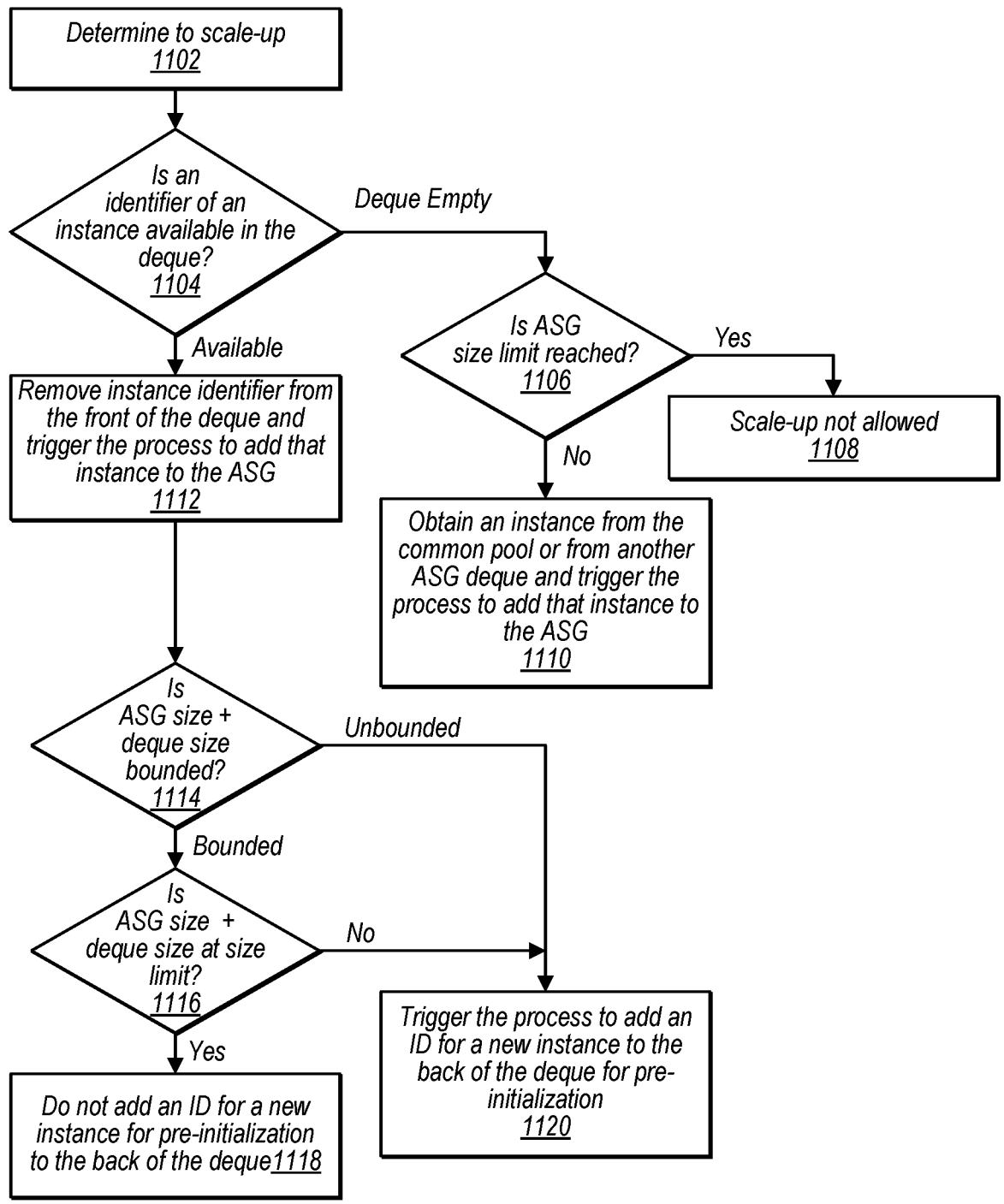
FIG. 11 is a process chart that illustrates a scale-up process for a system that implements scaling of groups of compute instances using rate-based dynamically-sized deques of preinitialized instances, according to at least some embodiments.

FIG. 11 is a process chart that illustrates a scale-up process for a system that implements scaling of groups of compute instances using rate-based dynamically-sized deques of pre-initialized instances, according to at least some embodiments. In some embodiments, a system monitors the historical scale-up rate for the particular group of instances and adjusts the size of the collection of pre-initialized instances for that group based on the monitored scale-up rate and based on the instance pre-initialization time (e.g., MTTT or other measure) for instances for that group. Components of a scaling manager may perform the described functionality, in some embodiments. While the illustrated embodiment describes an ASG and deque as a particular example, similar functionality may be performed by other groups of instances and other types of data structures.

At block 1102 a determination is made to scale-up, by scaling control manager, for example. A scale-up operation may be performed for a group in response to any of various events (e.g., as specified in a scaling policy stored in a scaling policy data store), such as, but not limited to, based on performance of the underlying resources of the group, based on increased request traffic, etc. A determination is made whether an identifier of an instance is available in the deque for the group (block 1104). If the deque is empty (block, 1104, empty) a determination is made whether the ASG has reached a size limit (block 1106) and if so (block 1106, yes) the scale-up may not be allowed or may be prevented (block 1108). If the size limit has not been reached (block 1106, no) an instance may be obtained from the common pool of instances or from another ASG deque (block 1110) and a process to add that instance to the ASG is triggered. For example, some techniques may include making a quantity (e.g., a percentage of active and/or static instances) of extra pre-initialized instances available as a buffer against unexpected instance needs (e.g., unexpected bursts of request traffic, instance failures, etc.).

If an identifier of an instance is available from the deque (block 1104, available) the instance identifier is removed from the front of the deque and the process to add that instance to the ASG is triggered (block 1112). A bound may be placed on the total size of the group of instances plus the corresponding collection of pre-initialized instances for the group, if desired, for some embodiments. At block, 1114 a determination is made whether the size of the ASG+the size of the deque for that ASG is bounded and at block 1116, a determination is made whether, if bounded, the ASG size plus the corresponding deque size at the size limit (e.g., reached a size-based threshold). If unbounded (block 1114 unbounded) or the size limit has not been reached (block 1116, no) the process to add an identifier for a new instance to the back of the deque for pre-initialization is triggered (block 1120). If bounded, and the ASG size plus the corresponding deque size are at, or have exceeded a size limit or threshold (block 1116, yes) an identifier for a new instance is not added to the back of the deque (block 1118). In some embodiments the bounding of the ASG plus the deque size is optional or may not be implemented at all.

Figure 12:
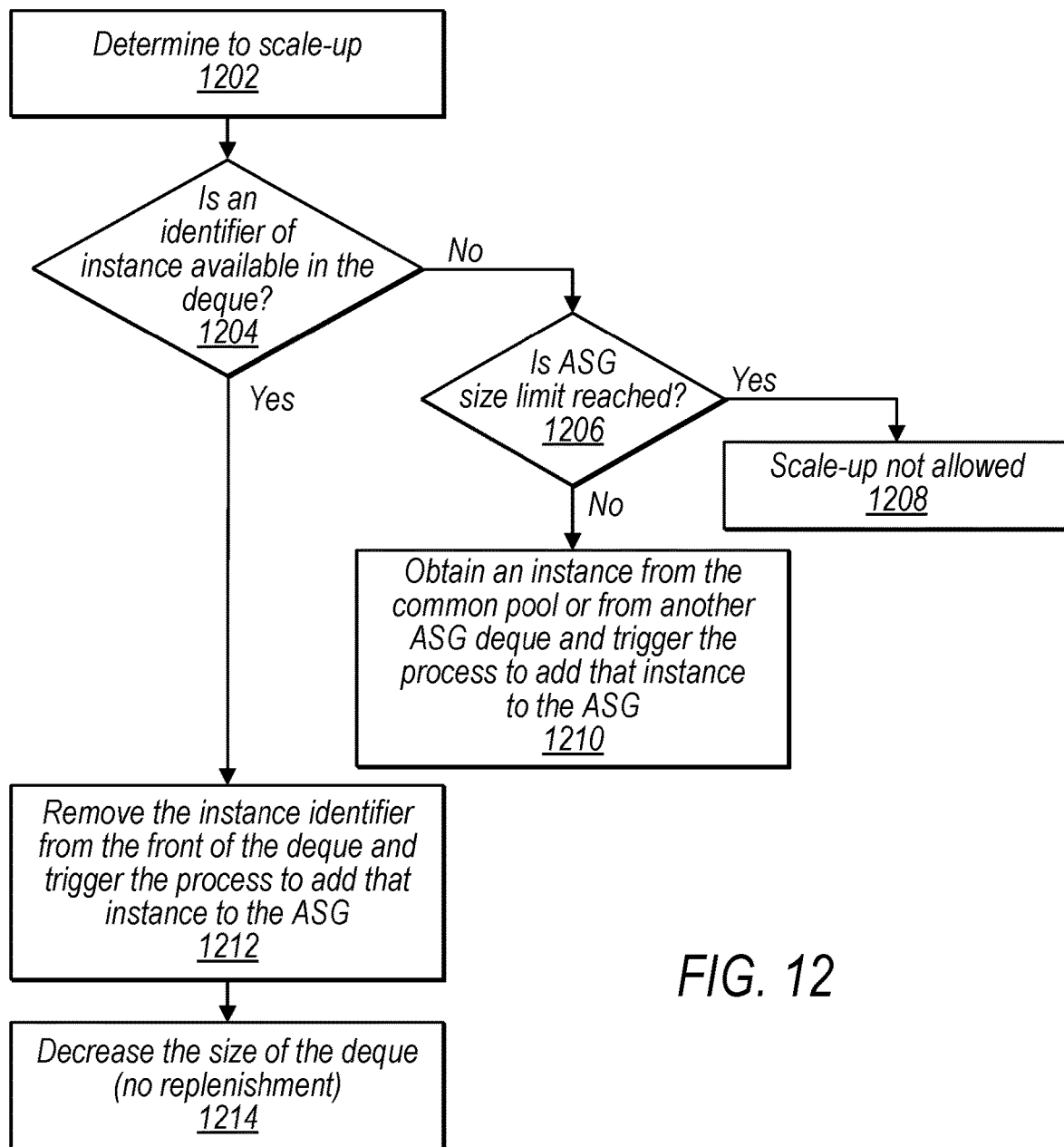
FIG. 12 is a process flow diagram that illustrates an alternative scale-up process for a system that implements scaling of groups of compute instances having a predetermined quantity of instances shared between the group and a respective collection of pre-initialized instances for the auto-scaling group, according to at least some embodiments.

FIG. 12 is a process chart that illustrates an alternative scale-up process for a system that implements scaling of groups of compute instances having a predetermined quantity of instances shared between the group and a respective collection of pre-initialized instances for the auto-scaling group (sometimes referred to herein as the assigned-butunused technique), according to at least some embodiments. In some embodiments, the illustrated functionality may be performed by one or more components of scaling manager.

At block 1202, a determination is made to scale-up. As described above for FIG. 11, the determination to scale-up may be made for any number of reasons, or be based on any number of events. At block 1204, the system determines whether an identifier of an instance is available in the deque for the ASG. If not, the system determines whether a size limit for the ASG has been reached (block 1206). The size limit for the ASG may be the predetermined quantity of instances shared between the group and a respective collection of pre-initialized instances for the auto-scaling group, in some embodiments. If the limit has been reached (e.g., if some threshold has been reached) scale-up is not allowed (block 1208). If the limit has not been reached (block 1206, no) an instance is obtained from the common pool or from another deque of another ASG and the process to add that instance to the ASG is triggered (block 1210).

For the case where the system determines that an identifier of the instance is available in the deque (block 1204, yes) the instance identifier is removed from the front of the deque and the process to add that instance to the ASG is triggered (block 1212). At block 1214, the size of the deque is decreased (no replenishment of the removed instance is performed). For example, scaling manager may instruct a request router to start sending traffic to the instance and instruct pre-initialized instance deque manager 112 to remove the identifier from the front of deque 112a. In some embodiments, the lack of replenishment (and the related decrease in size of the deque) is what keeps the predetermined quantity of instances shared between the group and a respective collection of pre-initialized instances for the auto-scaling group constant. A related process for scaling-down is illustrated in FIG. 5 (described below) where the deque size is increased as the ASG down-scales instance back into the collection of pre-initialized instances.

Figure 13:
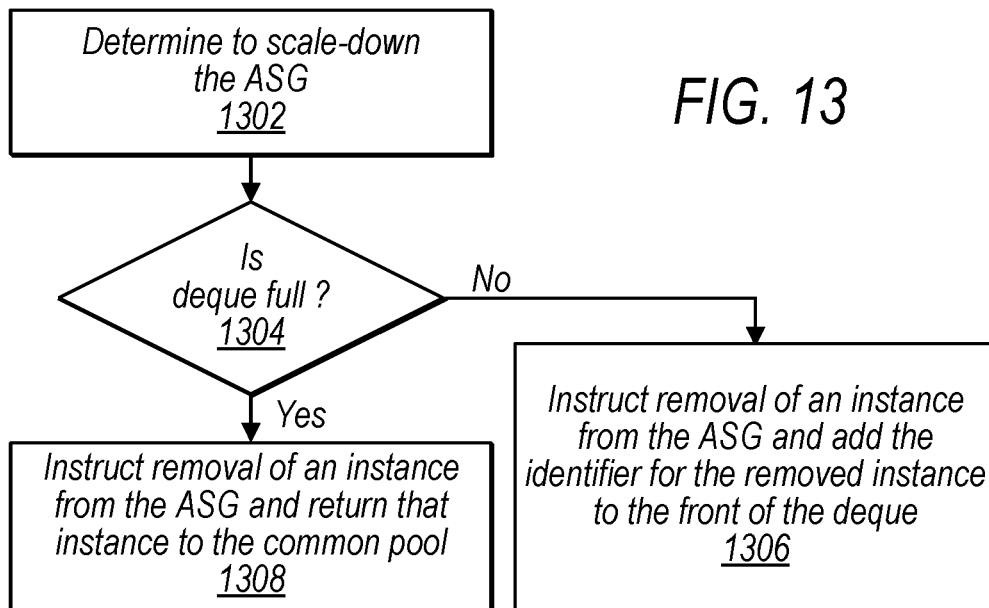
FIG. 13 is process flow diagram that illustrates an embodiment of a scale-down process for a system that implements combined active and pre-initialized resource management for rapid auto-scaling, according to at least some embodiments.
Figure 14:
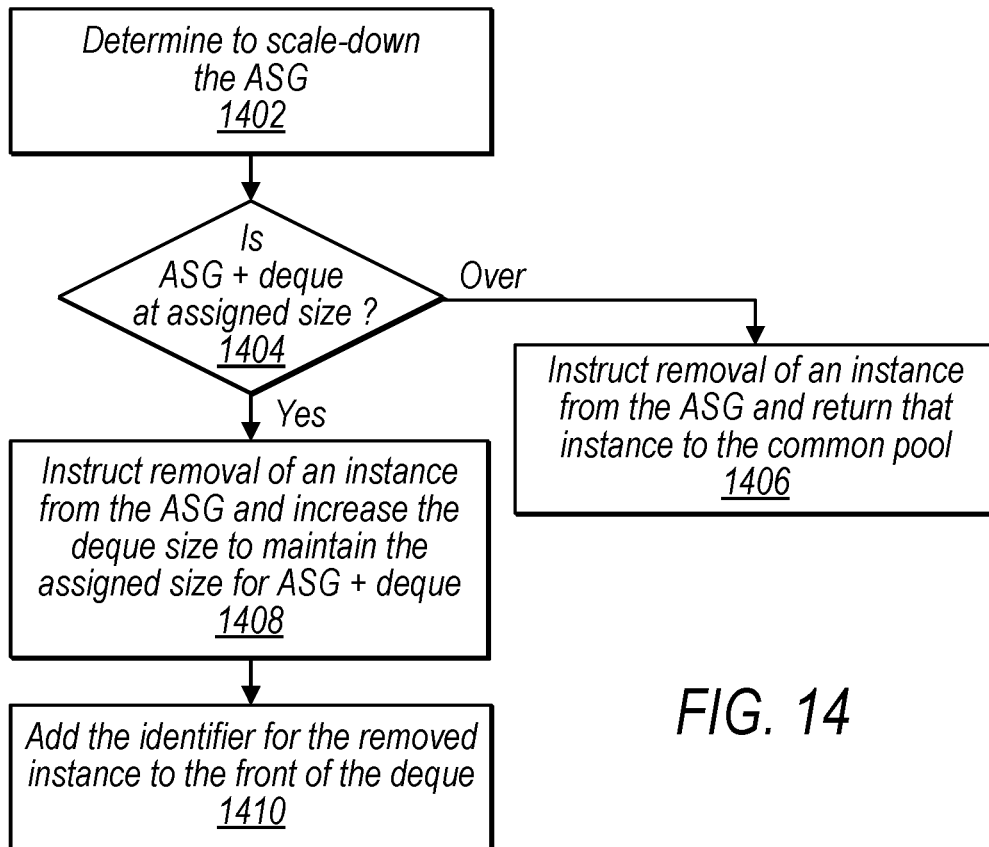
FIG. 14 is flow diagram that illustrates an alternative embodiment of a scale-down process for a system that implements combined active and pre-initialized resource management for rapid auto-scaling, according to at least some embodiments.

FIGS. 13 and 14 illustrate de-scaling processes. In particular, FIG. 13 is process chart that illustrates an embodiment of a scale-down process (e.g., for the rate-based example) for a system that implements combined active and pre-initialized resource management for rapid auto-scaling, according to at least some embodiments. FIG. 14 is process chart that illustrates an alternative embodiment of a scale-down process (e.g., for the assigned-but-unused example) for a system that implements combined active and pre-initialized resource management for rapid auto-scaling, according to at least some embodiments. Scaling-down may be performed by components of the scaling manager, by the scaling control manager, based on scaling policies stored in a scaling policy data store 108, for example.

At block 1302, a determination is made to scale-down. Down-scaling may be performed for any number of reasons and/or based on any event, such as, but not limited to, based on performance of the underlying resources (e.g. based on metrics obtained from a metrics service and/or metrics analyzed by metric analyzer 116), based on reduced request traffic, to conserve resources, etc.

At block 1304, a determination is made whether the deque for the ASG is full. If not (block 1304, no) removal of an instance from the ASG and addition of the identifier for the removed instance to the front of the deque is instructed (block 1306). For example, scaling manager may instruct a request router to stop sending traffic to the Instance1 in ASG 522 and instruct pre-initialized instance deque manager to place the identifier in the front of deque. If so, (1304, yes) removal of an instance from the ASG and return of that instance to the common pool, is instructed.

Moving on to FIG. 14 (e.g., for the assigned-but-unused example) a determination is made to scale-down the ASG (block 1402). In this case, a determination is made whether the sum of size of the ASG plus the size of the deque is at the assigned size (e.g., has the sum reached a threshold). Note that the sum may include an additional buffer amount of instances (e.g., a percentage of the instances), for responding to unexpected bursts in traffic of the like, for example. If over, removal of an instance from the ASG and return of the instance to the common pool is instructed (block 1406). For example, scaling control manager may instruct a component of the computer service or the request router directly, to stop directing request traffic to an instance of an of auto-scale group 522 and instruct a component of the compute service 150 (e.g., the instance provisioning manager 128) to move an identifier for that instance back into a common pool of instances.

At block 1408 (in the case where the sum of the size of the ASG plus the corresponding deque are at the assigned size (e.g., have reached a threshold)) removal of the instance from the ASG and increase of the size of the deque to maintain the assigned size for the sum of the ASG plus the deque is instructed. At block 1410, the identifier for the removed instance is added to the front of the deque (e.g., by pre-initialized instance deque manager).

Figure 15:
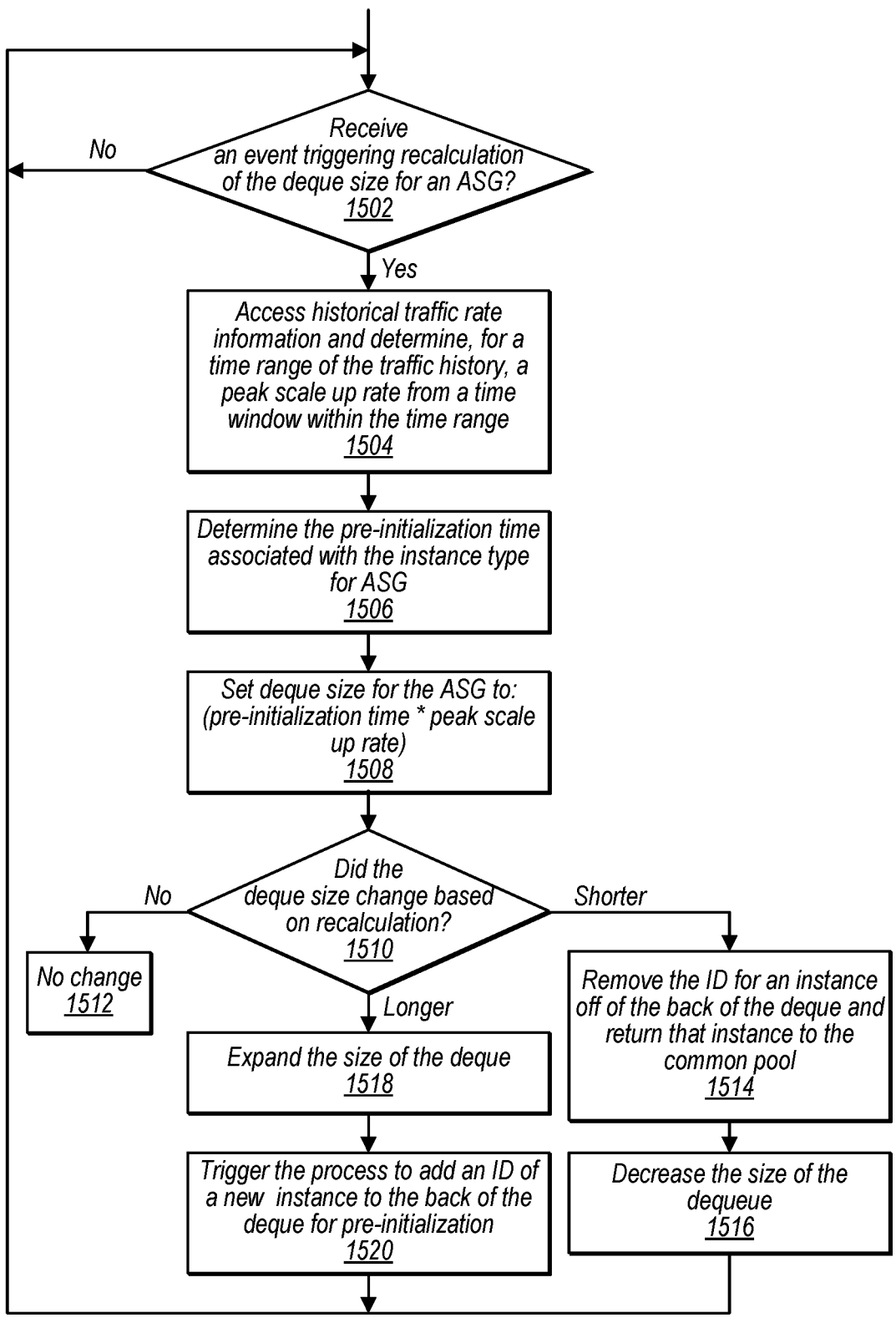
FIG. 15 is a flow diagram for calculating queue size for a system that implements combined active and pre-initialized resource management for rapid auto-scaling, according to at least some embodiments.

FIG. 15 is a process flow diagram for calculating deque size for a system that implements combined active and pre-initialized resource management for rapid auto-scaling, according to at least some embodiments. The process may be performed for other types of data structures than just deques. The process may be performed at any of various configurable times and/or every so often, could be performed continuously, hourly, daily, weekly, yearly, etc. as non-exhaustive examples. Any of various events may trigger the process, such as the system obtaining new/updated scale-up rate information or a new/updated pre-initialization time, as non-exhaustive examples. The calculation may be performed by a component of the scaling manager, such as the scaling control manager, in some embodiments.

At block 1502, an event triggering recalculation of the deque size for an ASG is received. As described above, example events may be time-based or event-based. Historical traffic rate information is accessed and a peak scale up rate from a time window within a time range of the traffic history is determined (block 1504). The historical traffic information may be based on performance of the ASG. In some embodiments, such information may not be available and historical traffic information from other ASGs may be used. The traffic information may be for an ASG with the same type of instances or from a group running the same service, as non-exhaustive examples. In some embodiments, the historical data itself, and/or the peak scale up rate, could be default values.

A pre-initialization time associated with the instance type of the ASG is determined. Pre-initialization times may be based on measurements of actual pre-initializations (for the same, similar or for different types of instances or services) or may be based on estimates provided to the system (e.g., by an admin or testing team, etc.) or may be based on default values, as non-exhaustive examples. Pre-initialization times (measured or estimated) may change over time; calculation of the deque size may be trigged based on updated pre-initialization times, in some embodiments.

The deque size is based on the pre-initialization time and the peak scale up rate. (e.g., based on the product of the pre-initialization time and the peak scale up rate in block 608). In some embodiments, the deque size may include some buffer amount. In some embodiments, the deque length is dynamically computed. For example, given a historical time period (time range T1), the system may compute the maximum number of hosts (a peak rate) requested in a tumbling window (time range T2) within that time period. Assume the maximum number of hosts is X. Some embodiments may include increasing X by some percentage to consider error. Assume increasing X by some percentage is Y. In some embodiments, the product of the MTTT and (Y/T2) is the size of the queue. The calculation may be performed every so often, depending on implementations (e.g., based on availability of updated MTTT or availability of updated historical rate information as non-exhaustive examples).

At block 1512, based on the deque size not changing based on the recalculation (block 1510, no) no change is made to the deque. At block 1514, based on the deque size getting shorter based on the recalculation (block 1510, shorter) the identifier for the instance is removed off the back of the deque, returned to the common pool, and the size of the deque is decreased (block 1516). At block 1518, based on the deque size getting longer based on the recalculation (block 1510, longer) the size of the deque is expanded, and the process to add an identifier of a new instance to the back of the deque for pre-initialization (e.g., similar to FIG. 15, described below) is triggered (block 1520).

Figure 16:
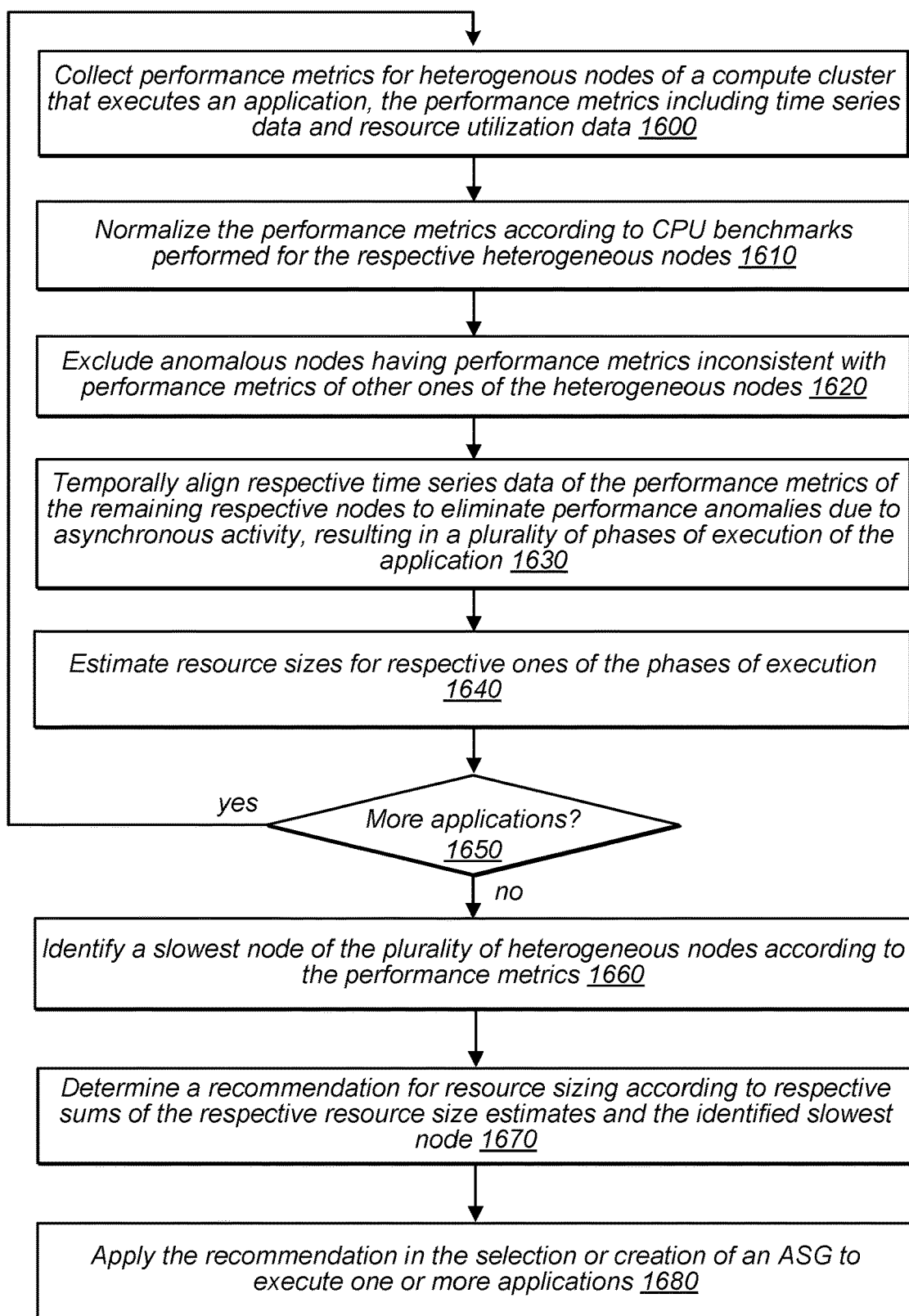
FIG. 16 is a process flow diagram that illustrates a process for determining right-sizing recommendations for applications executing on an auto-scaling group of variable size, according to at least some embodiments.

FIG. 16 is a process flow diagram that illustrates a process for determining right-sizing recommendations for applications executing on an auto-scaling group of variable size, according to at least some embodiments. The process begins at 1600 where performance metrics, such as service utilization data 202, service metadata 204 and CPU benchmarks 206 as shown in FIG. 2, may be collected for heterogeneous nodes of a computer cluster or scaling group that executes an application of one or more applications executing on an auto-scaling group (ASG). The performance metrics may include time series data and resource utilization data as well as CPU benchmark data used to normalize results of the heterogeneous nodes as shown in 1610.

The resulting normalized metrics may be analyzed to exclude nodes 1620 showing different usage patterns from most of their peers, resulting in the identification of normalized service utilization data at one or more of the heterogeneous nodes as indicative of node utilization for the application, in some embodiments.

The indicative data of the remaining nodes may then be temporally aligned as shown in 1630. Temporal alignment of utilization time series data from multiple tasks may be implemented using Constrained Dynamic Time Wrapping (CDTW) with backtracking, in some embodiments. This results in a set of data points for each phase of multiple execution phases of the application, thus mitigating potential asynchronous event issues which may show similar task usage without being aligned in time. The result of temporal alignment 1630 may be a set of timestamps within an anchor time series selected from among the time series data of the non-anomalous instances, in some embodiments.

Resource demand may be next determined to identify required resource sizes for various phases of execution of the application, as shown in 1640, in some embodiments, Different execution conditions may be considered for resource estimation. This process is discussed above in FIG. 4.

Then, if more applications remain to estimate resource sizes for, as shown in a positive exit from 1650, then the process may return to 1600, with estimated sizes for the various resources accumulated for all of the respective applications. if no more applications remain to estimate resource sizes for, as shown in a negative exit from 1650, then the process may proceed to step 1660.

Tasks of the application may execute on a compute cluster managed by a client. This compute cluster may have one or many instance types, hence it may present heterogeneous cluster issues. CPU performance may be different for tasks because they are hosted on different instances in the cluster. Individual instances of the cluster, using task placement data, may be evaluated to identify an instance with worst-case resource utilization to generate cluster performance data, as shown in 1670.

As shown in 1680, the resulting cluster performance data and the accumulated estimated resource sizes may be used to determine a right-sizing recommendation, such as the right-sizing recommendation 250 of FIG. 2, that may safely run the current workload and achieve maximum saving savings in cluster cost to the client, in some embodiments.

As shown in 1680, the resulting right-sizing recommendation may be applied to either the selection, creation or tuning of an ASG. In some embodiments, a compute service, such as the compute service 120 of FIG. 5, may provide a number of ASGs of differing characteristics. A right-sizing recommendation may be used to select among available ASGs to allocate an ASG for execution of a client workload including one or more applications. In other embodiments, a right-sizing recommendation may be used to create an ASG suitable to execute a client workload including one or more applications, and in still other embodiments, a right-sizing recommendation may be used to tune a previously allocated ASG to more optimally execute a client workload including one or more applications. These examples are not intended to be limiting and other methods of applying a right-sizing recommendation may be envisioned.

Figure 17:
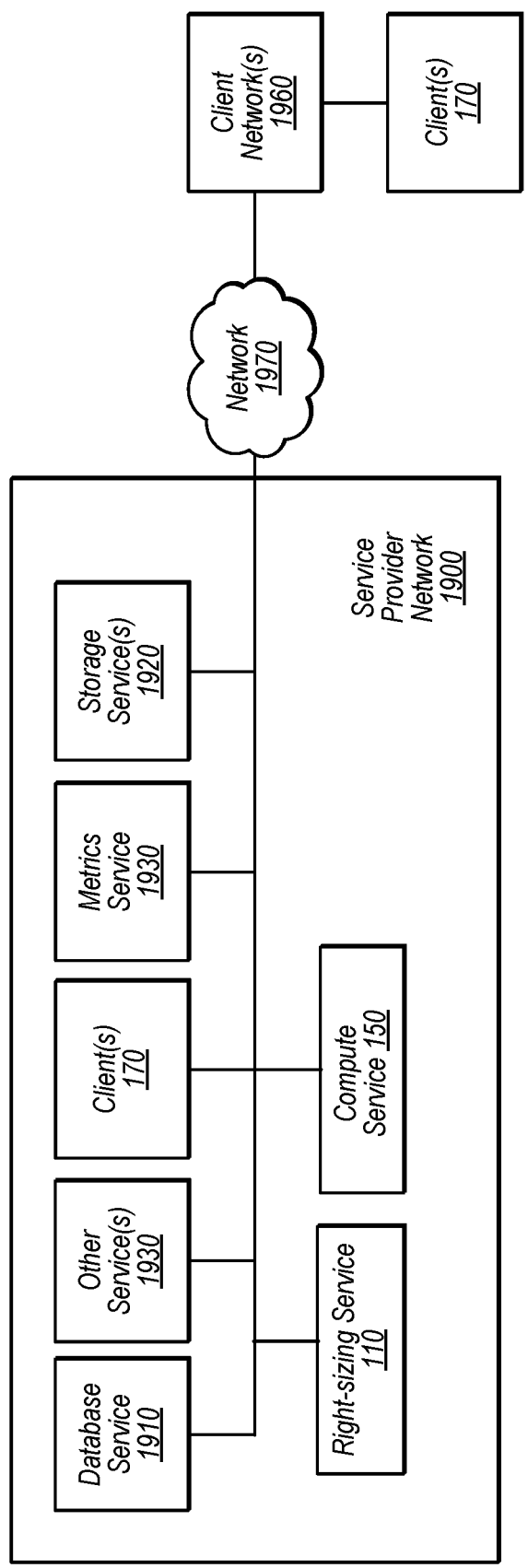
FIG. 17 is a block diagram illustrating a service-provider based architecture for a system that implements combined active and pre-initialized resource management for rapid auto-scaling, according to at least some embodiments.

FIG. 17 is a block diagram illustrating a service-provider based architecture for a system that implements combined active and pre-initialized resource management for rapid auto-scaling, according to at least some embodiments. In the illustrated embodiment, right-sizing service 110 and compute service 150 are services provided by service provider network 1900.

Service provider network 1900 is illustrated as providing numerous other services, such as, but not limited to, a database service 1910 (providing relational, non-relational database services, or both), storage service(s) 1920 (e.g., key-value store, short-term, long-term, or the like, etc.), metrics service 1930 (e.g., obtaining, aggregating and storing metrics about the various services of the service provider network) and clients 170. Clients 170 are illustrated as both external (communicably coupled via client networks 1960 and intermediate network 1970 (e.g., the Internet or similar) to the service provider network) and internal to the service provider network. In some embodiments, one of the services of the service provider network may be a client of another one of the services.

Illustrative System

Any of various computer systems may be configured to implement processes associated with a technique for multi-region, multi-primary data store replication as discussed with regard to the various figures above. FIG. 18 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 14 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for a right-sizing service as indicated at 2026, for the downloadable software or provider network are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 14 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more processors; and
a memory storing program instructions that, when executed on the one or more processors, implement a right-sizing service configured to:
compute, for individual ones of one or more applications executing on an auto-scaling group, respective resource sizes for a plurality of heterogeneous nodes of the auto-scaling group, wherein to compute respective resource sizes the right-sizing service is configured to:
collect performance metrics for respective ones of the plurality of heterogeneous nodes of the auto-scaling group executing the particular application, the performance metrics normalized according to respective computational benchmarks for the respective ones of the plurality of heterogeneous nodes;
temporally align respective time series data of respective ones of the plurality of heterogeneous nodes to identify a plurality of phases of execution of the particular application; and
estimate resource sizes based at least in part on respective resource sizes for respective ones of the plurality of phases of execution of the particular application;
determine composite resource sizes based at least in part on respective estimated resource sizes of the individual ones of one or more applications; and
provide a sizing recommendation for the auto-scaling group of compute nodes based at least in part on the composite resource size, wherein the sizing recommendation comprises a recommended number of compute nodes for the auto-scaling group and one or more recommended resource sizes for the recommended number of compute nodes.

2. The system of claim 1, wherein to provide the sizing recommendation for the auto-scaling group of compute nodes, the right-sizing service is configured to provide the sizing recommendation to the auto-scaling group manager; and wherein the right-sizing service is further configured to select, by the auto-scaling group manager, an auto-scaling group from a plurality of auto-scaling groups according to the provided sizing recommendation.

3. The system of claim 1, wherein to compute a particular one of the one or more applications, the right-sizing service is configured to determine the respective resource sizes for respective ones of the plurality of phases of execution of the particular application, wherein to determine the respective resource sizes for respective ones of the plurality of phases of execution of the particular application, the right-sizing service is configured to:
model utilization distribution using prior resource sizes for respective ones of the plurality of phases of execution of the application; and
select respective maximum upper bounds of resource utilization across nodes for the respective ones of the plurality of phases of execution of the application as the estimated respective resource sizes for respective ones of the plurality of phases of execution of the application.

4. The system of claim 3, wherein to estimate respective resource sizes for respective ones of the plurality of phases of execution, the right-sizing service is configured to:
average respective resource utilizations across nodes for respective ones of the plurality of phases of execution of the application;
generate a model of resource utilization comprising a plurality of states;
apply the model of resource utilization to estimate the respective resource sizes for respective ones of the plurality of phases of execution of the application for a first time period; and
revert, after completion of the first time period, the estimated respective resource sizes for respective ones of the plurality of phases of execution of the application to the selected respective maximum upper bounds of resource utilization across the nodes for the respective ones of the plurality of phases of execution of the application.

5. A method, comprising:
performing, by one or more computers implementing a right-sizing service:
computing, for individual ones of one or more applications executing on an auto-scaling group, respective resource sizes for a plurality of heterogeneous nodes of the auto-scaling group, wherein computing respective resource sizes for a particular one of the one or more applications comprises:
collecting performance metrics for respective ones of the plurality of heterogeneous nodes of the auto-scaling group executing the particular application, the performance metrics normalized according to respective computational benchmarks for the respective ones of the plurality of heterogeneous nodes;
temporally aligning respective time series data of respective ones of the plurality of heterogeneous nodes to identify a plurality of phases of execution of the particular application; and
estimating resource sizes based at least in part on respective resource sizes for respective ones of the plurality of phases of execution of the particular application;
determining composite resource sizes based at least in part on respective estimated resource sizes of the individual ones of one or more applications; and
providing a sizing recommendation for an auto-scaling group of compute nodes based at least in part on the composite resource size, wherein the sizing recommendation comprises a recommended number of compute nodes for the auto-scaling group and one or more recommended resource sizes for the recommended number of compute nodes.

6. The method of claim 5, wherein providing the sizing recommendation for the auto-scaling group of compute nodes comprises providing the sizing recommendation to the auto-scaling group executing the plurality of applications; and wherein the method further comprises:
 increasing or decreasing a number of compute nodes in the auto-scaling group according to the provided sizing recommendation.

7. The method of claim 5, wherein providing the sizing recommendation for the auto-scaling group of compute nodes comprises providing the sizing recommendation to the auto-scaling group manager; and wherein the method further comprises:
 selecting, by the auto-scaling group manager, an auto-scaling group from a plurality of auto-scaling groups according to the provided sizing recommendation.

8. The method of claim 5, wherein computing a particular one of the one or more applications further comprises determining the respective resource sizes for respective ones of the plurality of phases of execution of the particular application, comprising:
 estimating respective average and maximum resource utilizations for respective ones of the plurality of phases of execution of the application over a provided future time period; and
 selecting the greater of the estimated average resource utilization and the estimated maximum resource utilization for the respective ones of the plurality of phases of execution of the application.

9. The method of claim 5, wherein computing a particular one of the one or more applications further comprises determining the respective resource sizes for respective ones of the plurality of phases of execution of the particular application, comprising:
 modeling utilization distribution using prior resource sizes for respective ones of the plurality of phases of execution of the application; and
 selecting respective maximum upper bounds of resource utilization across nodes for the respective ones of the plurality of phases of execution of the application as the estimated respective resource sizes for respective ones of the plurality of phases of execution of the application.

10. The method of claim 9, wherein estimating respective resource sizes for respective ones of the plurality of phases of execution of the application further comprises:
 averaging respective resource utilizations across nodes for respective ones of the plurality of phases of execution of the application;
 generating a model of resource utilization comprising a plurality of states;
 applying the model of resource utilization to estimate the respective resource sizes for respective ones of the plurality of phases of execution of the application for a first time period; and
 reverting, after completion of the first time period, the estimated respective resource sizes for respective ones of the plurality of phases of execution of the application to the selected respective maximum upper bounds of resource utilization across the nodes for the respective ones of the plurality of phases of execution of the application.

11. The method of claim 5, wherein the one or more applications executing on an auto-scaling group comprises a plurality of applications, and wherein determining composite resource sizes comprises summing, for individual ones of the resource sizes, respective corresponding resource sizes for individual ones of the plurality of applications.

12. The method of claim 5, wherein the right-sizing service and a compute service providing the autoscaling group executing the one or more applications are implemented as part of a multi-tenant service provider network that provides a compute service for a plurality of distinct customer accounts.

13. One or more non-transitory computer-accessible storage media storing program instructions that when executed on or across one or more computing devices cause the one or more computing devices to implement a right-sizing service to perform:
 computing, for individual ones of one or more tasks executing on a compute cluster, respective resource sizes for a plurality of heterogeneous nodes of the compute cluster, wherein computing respective resource sizes for a particular one of the one or more tasks comprises:
  collecting performance metrics for respective ones of the plurality of heterogeneous nodes of the compute cluster executing the particular task, the performance metrics normalized according to respective computational benchmarks for the respective ones of the plurality of heterogeneous nodes;
  temporally aligning respective time series data of respective ones of the plurality of heterogeneous nodes to identify a plurality of phases of execution of the particular task; and
  estimating resource sizes based at least in part on respective resource sizes for respective ones of the plurality of phases of execution of the particular task;
 determining composite resource sizes based at least in part on respective estimated resource sizes of the individual ones of one or more tasks; and
 providing a sizing recommendation for the compute cluster based at least in part on the composite resource size, wherein the sizing recommendation comprises a recommended number of compute nodes for the compute cluster and one or more recommended resource sizes for the recommended number of compute nodes.

14. The one or more non-transitory computer-accessible storage media of claim 13, wherein providing the sizing recommendation for the compute cluster comprises providing the sizing recommendation to the compute cluster executing the plurality of tasks; and wherein the method further comprises:
 increasing or decreasing a number of compute nodes in the compute cluster according to the provided sizing recommendation.

15. The one or more non-transitory computer-accessible storage media of claim 13, wherein providing the sizing recommendation for the compute cluster comprises providing the sizing recommendation to a scaling manager; and wherein the method further comprises:
 selecting, by the scaling manager, compute cluster from a plurality of compute clusters according to the provided sizing recommendation.

16. The one or more non-transitory computer-accessible storage media of claim 13, wherein computing a particular one of the one or more tasks further comprises determining the respective resource sizes for respective ones of the plurality of phases of execution of the particular task, comprising:
 modeling utilization distribution using prior resource sizes for respective ones of the plurality of phases of execution of the task; and selecting respective maximum upper bounds of resource utilization across nodes for the respective ones of the plurality of phases of execution of the task as the estimated respective resource sizes for respective ones of the plurality of phases of execution of the task.

17. The one or more non-transitory computer-accessible storage media of claim 13, wherein computing a particular one of the one or more tasks further comprises determining the respective resource sizes for respective ones of the plurality of phases of execution of the particular task, comprising:
  estimating respective average and maximum resource utilizations for respective ones of the plurality of phases of execution of the task over a provided future time period; and
  selecting the greater of the estimated average resource utilization and the estimated maximum resource utilization for the respective ones of the plurality of phases of execution of the task.

18. The one or more non-transitory computer-accessible storage media of claim 17, wherein estimating respective resource sizes for respective ones of the plurality of phases of execution of the task further comprises:
  averaging respective resource utilizations across nodes for respective ones of the plurality of phases of execution of the task;
  generating a model of resource utilization comprising a plurality of states;
  applying the model of resource utilization to estimate the respective resource sizes for respective ones of the plurality of phases of execution of the task for a first time period; and
  reverting, after completion of the first time period, the estimated respective resource sizes for respective ones of the plurality of phases of execution of the task to the selected greater of the estimated average resource utilization and the estimated maximum resource utilization for the respective ones of the plurality of phases of execution of the task.

19. The one or more non-transitory computer-accessible storage media of claim 13, wherein the one or more tasks executing on a compute cluster comprises a plurality of tasks, and wherein determining composite resource sizes comprises summing, for individual ones of the resource sizes, respective corresponding resource sizes for individual ones of the plurality of tasks.

20. The one or more non-transitory computer-accessible storage media of claim 13, wherein the right-sizing service and a compute service providing the autoscaling group executing the one or more tasks are implemented as part of a multi-tenant service provider network that provides a compute service for a plurality of distinct customer accounts.

* * * * *